US009489086B1

(12) United States Patent
Marsden et al.

(10) Patent No.: US 9,489,086 B1
(45) Date of Patent: Nov. 8, 2016

(54) FINGER HOVER DETECTION FOR IMPROVED TYPING

(71) Applicant: TypeSoft Technologies, Inc., Menlo Park, CA (US)

(72) Inventors: Randal J. Marsden, Menlo Park, CA (US); Robert C. Chaplinsky, Atherton, CA (US); William Scott Edgar, Sherwood Park, CA (US); George E. Gerpheide, Sandy, UT (US)

(73) Assignee: APPLE INC., Cupertino, CA (US)

( * ) Notice: Subject to any disclaimer, the term of this patent is extended or adjusted under 35 U.S.C. 154(b) by 16 days.

(21) Appl. No.: 14/265,340

(22) Filed: Apr. 29, 2014

Related U.S. Application Data

(60) Provisional application No. 61/817,276, filed on Apr. 29, 2013.

(51) Int. Cl.
*G06F 3/042* (2006.01)

(52) U.S. Cl.
CPC ..................... *G06F 3/042* (2013.01)

(58) Field of Classification Search
CPC ............................ G06F 1/1673; G06F 3/042
See application file for complete search history.

(56) References Cited

U.S. PATENT DOCUMENTS

| 4,725,694 | A | 2/1988 | Auer et al. |
| 4,805,222 | A | 2/1989 | Young et al. |
| 5,404,458 | A | 4/1995 | Zetts |
| 5,416,498 | A | 5/1995 | Grant |
| 6,029,578 | A | 2/2000 | Weil et al. |
| 6,396,483 | B1 | 5/2002 | Hiller |
| 6,492,979 | B1 | 12/2002 | Kent et al. |
| 6,504,530 | B1 | 1/2003 | Wilson et al. |
| 6,525,717 | B1 | 2/2003 | Tang |
| 6,563,492 | B1 | 5/2003 | Furuya |
| 6,625,460 | B1 | 9/2003 | Patil |
| 6,650,318 | B1 | 11/2003 | Arnon |
| 6,657,616 | B2 | 12/2003 | Sims |
| 6,707,448 | B1 | 3/2004 | Kunimatsu et al. |

(Continued)

FOREIGN PATENT DOCUMENTS

| CN | 1075222 A | 8/1993 |
| CN | 2662340 Y | 12/2004 |

(Continued)

OTHER PUBLICATIONS

Office Action, dated May 15, 2015, received in U.S. Appl. No. 13/308,428, 26 pages.

(Continued)

*Primary Examiner* — Andrew Sasinowski
(74) *Attorney, Agent, or Firm* — Morgan, Lewis & Bockius LLP

(57) ABSTRACT

Typing on touchscreens is improved by dynamically and automatically positioning the desired home-row keys of an onscreen keyboard below the user's fingers while their fingers are hovering above the surface, thus reducing the need for the user to look at the onscreen keyboard while typing. The location of each of the user's fingers while hovering and/or resting is monitored. Correlation between the hover sensor data and touch sensor data increases the confidence level by which the system can determine which of the user's fingers were used to select a key. By determining which finger was used to make the selection, the system accurately disambiguates which letter the user intended to type.

19 Claims, 18 Drawing Sheets

(56) References Cited

U.S. PATENT DOCUMENTS

| | | |
|---|---|---|
| 6,762,749 B1 | 7/2004 | Gouzman et al. |
| 7,257,528 B1 | 8/2007 | Ritchie et al. |
| 7,309,829 B1 | 12/2007 | Ludwig |
| 7,339,580 B2 | 3/2008 | Westerman et al. |
| 7,499,039 B2 | 3/2009 | Roberts |
| 7,554,529 B2 | 6/2009 | Kotipalli |
| 7,557,312 B2 | 7/2009 | Clark et al. |
| 7,659,885 B2 | 2/2010 | Kraus et al. |
| 7,663,607 B2 | 2/2010 | Hotelling et al. |
| 7,768,501 B1 | 8/2010 | Maddalozzo, Jr. et al. |
| 7,813,774 B2 | 10/2010 | Perez-Noguera |
| 8,019,390 B2 | 9/2011 | Sindhu |
| 8,350,820 B2 | 1/2013 | Deslippe et al. |
| 8,390,572 B2 | 3/2013 | Marsden et al. |
| 8,624,841 B2 | 1/2014 | Kim et al. |
| 8,716,585 B2 | 5/2014 | Ludwig |
| 2002/0005108 A1 | 1/2002 | Ludwig |
| 2002/0005111 A1 | 1/2002 | Ludwig |
| 2002/0033285 A1 | 3/2002 | Afanasiev |
| 2002/0033795 A1 | 3/2002 | Shahoian et al. |
| 2002/0095586 A1 | 7/2002 | Doyle et al. |
| 2002/0140667 A1 | 10/2002 | Horiki |
| 2003/0063073 A1 | 4/2003 | Geaghan et al. |
| 2003/0071858 A1 | 4/2003 | Morohoshi |
| 2003/0122784 A1 | 7/2003 | Shkolnikov |
| 2003/0206162 A1 | 11/2003 | Roberts |
| 2003/0235452 A1 | 12/2003 | Kraus et al. |
| 2004/0004559 A1 | 1/2004 | Rast |
| 2004/0108995 A1 | 6/2004 | Hoshino et al. |
| 2004/0125086 A1 | 7/2004 | Hagermoser et al. |
| 2005/0059418 A1 | 3/2005 | Northcutt |
| 2005/0063757 A1 | 3/2005 | Sugimura et al. |
| 2005/0104867 A1* | 5/2005 | Westerman .......... G06F 3/0235 345/173 |
| 2005/0120870 A1 | 6/2005 | Ludwig |
| 2005/0121980 A1 | 6/2005 | Bruwer |
| 2005/0122313 A1 | 6/2005 | Ashby |
| 2005/0122322 A1 | 6/2005 | Furuya et al. |
| 2005/0162402 A1 | 7/2005 | Watanachote |
| 2005/0179565 A1 | 8/2005 | Mase et al. |
| 2005/0190970 A1 | 9/2005 | Griffin |
| 2005/0246652 A1 | 11/2005 | Morris |
| 2006/0097991 A1 | 5/2006 | Hotelling et al. |
| 2006/0114238 A1 | 6/2006 | Wong et al. |
| 2006/0139312 A1 | 6/2006 | Sinclair, II et al. |
| 2006/0152497 A1 | 7/2006 | Rekimoto |
| 2006/0152499 A1 | 7/2006 | Roberts |
| 2006/0180450 A1 | 8/2006 | Clark et al. |
| 2006/0181520 A1 | 8/2006 | Ikegawa |
| 2006/0192763 A1 | 8/2006 | Ziemkowski |
| 2006/0232558 A1 | 10/2006 | Chien |
| 2006/0238503 A1 | 10/2006 | Smith et al. |
| 2006/0274920 A1 | 12/2006 | Tochikubo et al. |
| 2006/0279548 A1 | 12/2006 | Geaghan |
| 2006/0284858 A1 | 12/2006 | Rekimoto |
| 2007/0024593 A1 | 2/2007 | Schroeder |
| 2007/0040813 A1 | 2/2007 | Kushler et al. |
| 2007/0047702 A1 | 3/2007 | Newell et al. |
| 2007/0060131 A1 | 3/2007 | Wilson |
| 2007/0091070 A1 | 4/2007 | Larsen et al. |
| 2007/0096930 A1 | 5/2007 | Cardoso |
| 2007/0120762 A1 | 5/2007 | O'Gorman |
| 2007/0120832 A1 | 5/2007 | Saarinen et al. |
| 2007/0139382 A1 | 6/2007 | Kotipalli |
| 2007/0139395 A1 | 6/2007 | Westerman et al. |
| 2007/0216658 A1 | 9/2007 | Rainisto |
| 2007/0229466 A1 | 10/2007 | Peng et al. |
| 2007/0229476 A1 | 10/2007 | Huh |
| 2007/0236478 A1 | 10/2007 | Geaghan et al. |
| 2007/0247316 A1 | 10/2007 | Wildman et al. |
| 2007/0247429 A1 | 10/2007 | Westerman |
| 2007/0294263 A1 | 12/2007 | Punj et al. |
| 2008/0018614 A1 | 1/2008 | Rekimoto |
| 2008/0042978 A1 | 2/2008 | Perez-Noguera |
| 2008/0042989 A1 | 2/2008 | Westerman |
| 2008/0122796 A1 | 5/2008 | Jobs et al. |
| 2008/0146082 A1 | 6/2008 | Lin et al. |
| 2008/0150905 A1 | 6/2008 | Grivna et al. |
| 2008/0170046 A1 | 7/2008 | Rimon et al. |
| 2008/0225006 A1 | 9/2008 | Ennadi |
| 2008/0237021 A1 | 10/2008 | Struve |
| 2008/0270558 A1 | 10/2008 | Ma |
| 2008/0273013 A1 | 11/2008 | Levine et al. |
| 2008/0281923 A1 | 11/2008 | Barchi |
| 2008/0289887 A1 | 11/2008 | Flint et al. |
| 2008/0309519 A1 | 12/2008 | Bengtsson et al. |
| 2009/0002217 A1 | 1/2009 | Kryze et al. |
| 2009/0009482 A1 | 1/2009 | McDermid |
| 2009/0016000 A1 | 1/2009 | Kobayashi |
| 2009/0045700 A1 | 2/2009 | Sasaki et al. |
| 2009/0046110 A1 | 2/2009 | Sadler et al. |
| 2009/0051447 A1 | 2/2009 | McCracken et al. |
| 2009/0073128 A1 | 3/2009 | Marsden |
| 2009/0091458 A1 | 4/2009 | Deutsch |
| 2009/0207574 A1 | 8/2009 | Chen et al. |
| 2009/0225041 A1 | 9/2009 | Kida et al. |
| 2009/0226091 A1 | 9/2009 | Goldsmith et al. |
| 2009/0237254 A1 | 9/2009 | Munro et al. |
| 2009/0237359 A1 | 9/2009 | Kim et al. |
| 2009/0273477 A1 | 11/2009 | Barnhill |
| 2009/0273571 A1 | 11/2009 | Bowens |
| 2009/0282917 A1 | 11/2009 | Acar |
| 2009/0284476 A1 | 11/2009 | Bull et al. |
| 2010/0020043 A1 | 1/2010 | Park et al. |
| 2010/0042827 A1 | 2/2010 | Pratt et al. |
| 2010/0045705 A1 | 2/2010 | Vertegaal et al. |
| 2010/0060585 A1 | 3/2010 | Chiu |
| 2010/0064244 A1 | 3/2010 | Kilpatrick, II et al. |
| 2010/0065640 A1 | 3/2010 | Maeda et al. |
| 2010/0085382 A1 | 4/2010 | Lundqvist et al. |
| 2010/0101921 A1 | 4/2010 | Howie et al. |
| 2010/0103139 A1* | 4/2010 | Soo ................ G06F 3/0416 345/175 |
| 2010/0153879 A1 | 6/2010 | Rimas-Ribikauskas et al. |
| 2010/0177057 A1 | 7/2010 | Flint et al. |
| 2010/0194692 A1 | 8/2010 | Orr et al. |
| 2010/0220061 A1 | 9/2010 | Bos et al. |
| 2010/0323762 A1 | 12/2010 | Sindhu |
| 2011/0037734 A1 | 2/2011 | Pance et al. |
| 2011/0043475 A1 | 2/2011 | Rigazio et al. |
| 2011/0050576 A1 | 3/2011 | Forutanpour et al. |
| 2011/0068930 A1 | 3/2011 | Wildman et al. |
| 2011/0126141 A1 | 5/2011 | King et al. |
| 2011/0227740 A1 | 9/2011 | Wohltjen |
| 2011/0316703 A1 | 12/2011 | Butler et al. |
| 2011/0316784 A1 | 12/2011 | Bisutti et al. |
| 2012/0056814 A1 | 3/2012 | Sudo |
| 2012/0062382 A1 | 3/2012 | Taneff |
| 2012/0075192 A1 | 3/2012 | Marsden et al. |
| 2012/0075193 A1 | 3/2012 | Marsden et al. |
| 2012/0112906 A1 | 5/2012 | Borke et al. |
| 2012/0113028 A1 | 5/2012 | Marsden et al. |
| 2012/0117506 A1 | 5/2012 | Koch et al. |
| 2012/0133589 A1 | 5/2012 | Marsden et al. |
| 2012/0167170 A1 | 6/2012 | Shi et al. |
| 2012/0206384 A1 | 8/2012 | Marsden et al. |
| 2012/0260207 A1* | 10/2012 | Treskunov .......... G06F 3/04886 715/773 |
| 2012/0306758 A1 | 12/2012 | Marsden et al. |
| 2013/0021248 A1 | 1/2013 | Eleftheriou |
| 2013/0093715 A1 | 4/2013 | Marsden et al. |
| 2013/0187775 A1 | 7/2013 | Marsden et al. |
| 2013/0265273 A1 | 10/2013 | Marsden et al. |
| 2014/0028624 A1 | 1/2014 | Marsden et al. |
| 2014/0035824 A1 | 2/2014 | Bernstein et al. |
| 2015/0049059 A1 | 2/2015 | Zadesky et al. |
| 2015/0067571 A1 | 3/2015 | Marsden |
| 2015/0324116 A1 | 11/2015 | Marsden et al. |

FOREIGN PATENT DOCUMENTS

| | | |
|---|---|---|
| CN | 1666170 A | 9/2005 |
| CN | 1864125 A | 11/2006 |
| CN | 101036105 A | 9/2007 |

(56) References Cited

FOREIGN PATENT DOCUMENTS

| | | |
|---|---|---|
| CN | 101036205 A | 9/2007 |
| JP | 07-306752 A | 11/1995 |
| JP | 10-208110 | 8/1998 |
| JP | 63311521 A | 12/1998 |
| JP | 11-085352 | 3/1999 |
| JP | 11-136116 | 5/1999 |
| JP | 2002297316 A | 10/2002 |
| JP | 2004265383 A | 9/2004 |
| JP | 2005204251 A | 7/2005 |
| JP | 2005531861 A | 10/2005 |
| JP | 2006323589 A | 11/2006 |
| JP | 2007-184006 A | 7/2007 |
| JP | 2007-184008 A | 7/2007 |
| JP | 2008-544352 A | 12/2008 |
| JP | 2009-520271 A | 5/2009 |
| KR | 200191841 Y1 | 8/2000 |
| KR | 20040106552 A | 12/2004 |
| KR | 20090060888 A | 6/2009 |
| KR | 20090101741 A | 9/2009 |
| KR | 10-2010-0012321 A | 2/2010 |
| KR | 20100029026 A | 3/2010 |
| KR | 20100029421 A | 3/2010 |
| KR | 2010-0065640 A | 6/2010 |
| WO | WO 2006/039033 A2 | 4/2006 |
| WO | WO 2006/088752 A2 | 8/2006 |
| WO | WO 2006/133018 A2 | 12/2006 |
| WO | WO 2007/144014 A1 | 12/2007 |

OTHER PUBLICATIONS

Notice of Allowance, dated Apr. 23, 2015, received in U.S. Appl. No. 13/355,450, 12 pages.
Notice of Allowance, dated May 15, 2015, received in U.S. Appl. No. 13/506,342, 8 pages.
International Search Report and Written Opinion dated Nov. 29, 2012, received in International Patent Application No. PCT/US2012/000199, which corresponds to U.S. Appl. No. 14/110,229, 7 pages.
International Preliminary Report on Patentability, dated Oct. 8, 2013, received in International Patent Application No. PCT/US2012/000199, which corresponds to U.S. Appl. No. 14/110,229, 5 pages.
Devlin Medical, CleanKey Keyboard, www.DevlinMedical.co.uk, Hampshire, UK, 1 page.
Office Action dated Jul. 12, 2011, received in U.S. Appl. No. 12/234,053, 15 pages.
Office Action dated Nov. 2, 2011, received in Chinese Patent Application No. 200880116618.7, which corresponds to U.S. Appl. No. 12/234,053, 2 pages.
Final Office Action dated Dec. 8, 2011, received in U.S. Appl. No. 12/234,053, 20 pages.
Office Action dated Apr. 24, 2012, received in Chinese Patent Application No. 200880116618.7, which corresponds to U.S. Appl. No. 12/234,053, 7 pages.
Office Action dated Jun. 1, 2012, received in U.S. Appl. No. 12/234,053, 18 pages.
Notice of Allowance dated Sep. 17, 2012, received in U.S. Appl. No. 12/234,053, 7 pages.
Office Action, dated Nov. 8, 2012, received in European Patent Application No. 08 832 204.5, which corresponds to U.S. Appl. No. 12/234,053, 5 pages.
Office Action dated Nov. 16, 2012, received in Chinese Patent Application No. 200880116618.7, which corresponds to U.S. Appl. No. 12/234,053, 7 pages.
Office Action dated Aug. 21, 2012, received in Japanese Patent Application No. 2010-525997, which corresponds to U.S. Appl. No. 12/234,053, 9 pages.
Final Office Action dated Jan. 22, 2013, received in Japanese Patent Application No. 2010-525997, which corresponds to U.S. Appl. No. 12/234,053, 10 pages.
Rejection Decision dated May 9, 2013, received in Chinese Patent Application No. 200880116618.7, which corresponds to U.S. Appl. No. 12/234,053, 6 pages.
Office_Action dated Nov. 26, 2014, received in KR 1020107008557, which corresponds to U.S. Appl. No. 12/234,053, 13 pages.
Office Action dated May 19, 2014, received in U.S. Appl. No. 13/442,855, 18 pages.
Final Office Action dated Dec. 9, 2014, received in U.S. Appl. No. 13/442,855, 31 pages.
Notice of Allowance dated Jan. 5, 2015, received in U.S. Appl. No. 13/171,124, 8 pages.
Office Action dated Aug. 26, 2013, received in U.S. Appl. No. 13/171,124, 12 pages.
Office Action dated Feb. 25, 2014, received in Japanese Patent Application No. JP 2013-518583, which corresponds to U.S. Appl. No. 13/171,124, 5 pages.
Final Office Action dated May 29, 2014, received in U.S. Appl. No. 13/171,124, 11 pages.
Office Action dated May 16, 2012, received in U.S. Appl. No. 13/365,719, 20 pages.
Final Office Action dated Oct. 19, 2012, received in U.S. Appl. No. 13/365,719, 9 pages.
Notice of Allowance dated Nov. 13, 2012, received in U.S. Appl. No. 13/365,719, 7 pages.
Office Action dated May 6, 2014, received in U.S. Appl. No. 13/308,416, 19 pages.
Office Action dated Aug. 19, 2014, recevied in Japanese Patent Application No. 2013-542153, which corresponds to U.S. Appl. No. 13/308,416, 5 pages.
Office Action dated Nov. 12, 2014, recevied in Korean Patent Application No. 10-2013-7016964, which corresponds to U.S. Appl. No. 13/308,416, 5 pages.
Final Office Action dated Jan. 30, 2015, received in U.S. Appl. No. 13/308,416, 38 pages.
Final Office Action dated Dec. 22, 2014, received in U.S. Appl. No. 13/308,428, 29 pages.
Office Action dated May 2, 2014, received in U.S. Appl. No. 13/308,428, 12 pages.
Office Action dated May 16, 2014, received in U.S. Appl. No. 13/355,450, 12 pages.
Final Office Action dated Nov. 7, 2014, received in U.S. Appl. No. 13/355,450, 22 pages.
Office Action dated Jan. 27, 2014, received in U.S. Appl. No. 13/506,342, 13 pages.
Notice of Allowance dated Nov. 21, 2014, received in U.S. Appl. No. 13/506,342, 8 pages.
Office Action dated Jun. 18, 2013, received in U.S. Appl. No. 13/485,802, 11 pages.
Office Action dated Aug. 10, 2012, received in U.S. Appl. No. 13/485,802, 8 pages.
Final Office Action dated Dec. 10, 2012, received in U.S. Appl. No. 13/485,802, 11 pages.
Office Action dated Feb. 27, 2014, received in U.S. Appl. No. 13/747,469, 8 pages.
Office Action dated Sep. 25, 2014, received in U.S. Appl. No. 14/110,229, 34 pages.
Extended European Search Report, dated Mar. 19, 2012, received in European Patent Application No. 08832204.5, which corresponds to U.S. Appl. No. 12/234,053, 8 pages.
International Preliminary Report on Patentability dated Mar. 24, 2010, received in International Patent Application No. PCT/US2008/077007, which corresponds to U.S. Appl. No. 12/234,053, 4 pages.
International Search Report and Written Opinion dated Apr. 28, 2009, received in International Patent Application No. PCT/US2008/077007, which corresponds to U.S. Appl. No. 12/234,053, 7 pages.
International Preliminary Report on Patentability dated Dec. 28, 2012, received in International Patent Application No. PCT/US2011/042225, which corresponds to U.S. Appl. No. 13/442,855, 4 pages.

(56) References Cited

OTHER PUBLICATIONS

International Search Report and Written Opinion dated Feb. 9, 2012, received in International Patent Application No. PCT/US2011/042225, which corresponds to U.S. Appl. No. 13/442,855, 6 pages.

International Preliminary Report on Patentability dated Jun. 4, 2013, received in International Patent Application No. PCT/US2011/062721, which corresponds to U.S. Appl. No. 13/308,416, 5 pages.

International Search Report and Written Opinion dated Jul. 30, 2012, received in International Patent Application No. PCT/US2011/062721, which corresponds to U.S. Appl. No. 13/308,416, 7 pages.

International Preliminary Report on Patentability dated Jun. 4, 2013, received in International Patent Application No. PCT/US2011/062723, which corresponds to U.S. Appl. No. 13/308,416, 5 pages.

International Search Report and Written Opinion dated Jul. 20, 2012, received in International Patent Application No. PCT/US2011/062723, which corresponds to U.S. Appl. No. 13/308,416, 7 pages.

International Preliminary Report on Patentability dated Apr. 1, 2013, received in International Patent Application No. PCT/US2012/000210, which corresponds to U.S. Appl. No. 13/355,450, 7 pages.

International Search Report and Written Opinion dated Jul. 27, 2012, received in International Patent Application No. PCT/US2012/000210, which corresponds to U.S. Appl. No. 13/355,450, 7 pages.

International Preliminary Report on Patentability dated Dec. 2, 2013, received in International Patent Application No. PCT/US2012/040296, which corresponds to U.S. Appl. No. 13/485,802, 5 pages.

International Search Report and Written Opinion dated Jan. 10, 2013, received in International Patent Application No. PCT/US2012/040296, which corresponds to U.S. Appl. No. 13/485,802, 7 pages.

Notice of Allowance, dated Aug. 3, 2015, received in Japanese Patent Application No. 2010-525997, which corresponds with U.S. Appl. No. 12/234,053, 3 pages.

Office Action, dated Jul. 22, 2015, received in U.S. Appl. No. 13/442,855, 15 pages.

Office Action dated Apr. 28, 2015, received in Chinese Patent Application No. 201180039270.8, which corresponds with U.S. Appl. No. 13/171,124, 2 pages.

Notice of Allowance dated Jun. 30, 2015, received in U.S. Appl. No. 13/308,416, 9 pages.

Notice of Allowance, dated Jun. 30, 2015, received in Korean Patent Application No. 10-2013-7016964, which corresponds to U.S. Appl. No. 13/308,416, 8 pages.

Notice of Allowance, dated Jun. 29, 2015, received in U.S. Appl. No. 13/506,342, 8 pages.

Office Action, dated Oct. 1, 2015, received in U.S. Appl. No. 14/169,002, 13 pages.

Office Action, dated Sep. 24, 2015, received in U.S. Appl. No. 14/046,836, 10 pages.

Fu, "Touch Keyboard," Tianjin Funa Yuanchuang Technology Co Ltd, Jul. 4, 2012, 55 pages.

Patent Certificate, dated Jun. 8, 2016, received in Chinese Patent Application No. 200880116618.7, which corresponds to U.S. Appl. No. 12/234,053, 2 pages.

Letters Patent, dated Dec. 14, 2015, received in Korean Patent Application No. 10-20103-7008557, which corresponds to U.S. Appl. No. 12/234,053, 2 pages.

Notice of Allowance, dated May 24, 2016, received in U.S. Appl. No. 13/442,855, 12 pages.

Notice of Allowance, dated Feb. 18, 2016, received in U.S. Appl. No. 13/171,124, 7 pages.

Office Action dated May 19, 2016, received in U.S. Appl. No. 13/171,124, 13 pages.

Notice of Allowance, dated Feb. 3, 2016, received in Chinese Patent Application No. 201180039270.8, which corresponds with U.S. Appl. No. 13/171,124, 2 pages.

Certificate of Patent, dated Mar. 16, 2016, received in Chinese Patent Application No. 201180039270.8, which corresponds with U.S. Appl. No. 13/171,124, 2 pages.

Notice of Allowance, dated Oct. 30, 2015, received in Japanese Patent Application No. 2013-518583, which corresponds with U.S. Appl. No. 13/171,124, 5 pages.

Office Action, dated Aug. 25, 2015, received in Chinese Patent Application No. 201180064220.5, which corresponds with U.S. Appl. No. 13/308,416, 2 pages.

Decision to Grant, dated May 4, 2016, received in Chinese Patent Application No. 201180064220.5, which corresponds with U.S. Appl. No. 13/308,416, 2 pages.

Letters Patent, dated Dec. 14, 2015, received in Korean Patent Application No. 10-2013-7016964, which corresponds to U.S. Appl. No. 13/308,416, 3 pages.

Office Action, dated Nov. 18, 2015, received in U.S. Appl. No. 13/308,428, 25 pages.

Final Office Action, dated Nov. 24, 2015, received in U.S. Appl. No. 13/308,428, 26 pages.

Final Office Action, dated May 3, 2016, received in U.S. Appl. No. 14/169,002, 12 pages.

Extended European Search Report, dated Feb. 29, 2016, received in European Patent Application No. 11804144.1, which corresponds to U.S. Appl. No. 13/171,124, 7 pages.

Supplementary European Search Report, dated Mar. 17, 2016, received in European Patent Application No. 11804144.1, which corresponds to U.S. Appl. No. 13/171,124, 8 pages.

\* cited by examiner

FINGER HOVER DETECTION FOR IMPROVED TYPING

CROSS REFERENCE TO RELATED APPLICATIONS

This application hereby claims priority to and incorporates by reference U.S. Provisional Application No. 61/817,276 filed Apr. 29, 2013 and titled "Finger Hover Detection for Improved Typing."

TECHNICAL FIELD

The disclosure herein relates to data processing systems and more particularly to improved typing accuracy in data processing systems.

INTRODUCTION

The origin of the modern keyboard as the primary method for inputting text and data from a human to a machine dates back to early typewriters in the 19th century. As computers were developed, it was a natural evolution to adapt the typewriter keyboard to be used as the primary method for inputting text and data. While the implementation of the keys on a typewriter and subsequently computer keyboards have evolved from mechanical to electrical and finally to electronic, the size, placement, and mechanical nature of the keys themselves have remained largely unchanged.

Conventional typing paradigms have centered around the idea of a "home row"—keys typically located on the middle row of the keyboard that the operator uses to orient their hands and fingers to the keyboard. On the ubiquitous Qwerty keyboard layout, the home-row keys (for English) are the 'asdf' keys for the left hand, and 'jkl;' keys for the right hand. The 'f' and 'j' keys also typically have tactile markers that help the user to locate their hands on the home-row keys without looking.

Driven by the mechanical nature of conventional keyboards, the layout of the keys have nearly always been in straight, evenly-spaced, rows. The problem with this approach is that human fingers do not naturally form a straight line; instead, resting or hovering fingers typically form an inverted cupped shape. Further, that shape is often different from user to user as a result of individual physical hand characteristics, typing style, or both. An ideally shaped keyboard would conform to the user's hand shape, forming the home row around their fingers. But this has been impossible as long as the keyboard is made up of non-locatable mechanical keys.

As computer operating systems evolved to include graphical user interfaces, the mouse pointer was introduced as a user input device that was complimentary to the keyboard. Various forms of pointing devices evolved from the original mouse, including trackballs and touchpads.

The paradigm of the keyboard and mouse was maintained for nearly three decades of computer evolution, as every desktop and laptop computer incorporated them in one form or another. However, recently, this paradigm has been shifting; with the introduction of touch surface computing devices (such as tablet computers), the physical keyboard and mouse are increasingly absent as part of the default user input modality. These devices often rely solely on the user's touch interaction directly with the onscreen objects for input.

The concept of a keyboard, however, has not completely disappeared due to the fact that people still need to input large amounts of text data into the touchscreen device. Most touchscreen devices provide an onscreen keyboard that the user can type on. However, typing on the screen of a touch screen can be slow and lacks the tactile feel that allows the user to type quickly without looking at their fingers.

Because there is a lack of tactile feel when the user types on the screen, the user often makes mistakes when typing on an on-screen keyboard. While there have been numerous proposals for disambiguating error-prone user input, many such proposals rely heavily on linguistic context and are unable to resolve interchangeable alternatives (e.g., where a user strikes ambiguously between keys T and 'o' followed by 'n' leaving uncertainty whether "in" or "on" was intended).

BRIEF DESCRIPTION OF THE DRAWINGS

The disclosure herein is illustrated by way of example, and not by way of limitation, in the figures of the accompanying drawings and in which like reference numerals refer to similar elements and in which.

DETAILED DESCRIPTION

Figure 1:
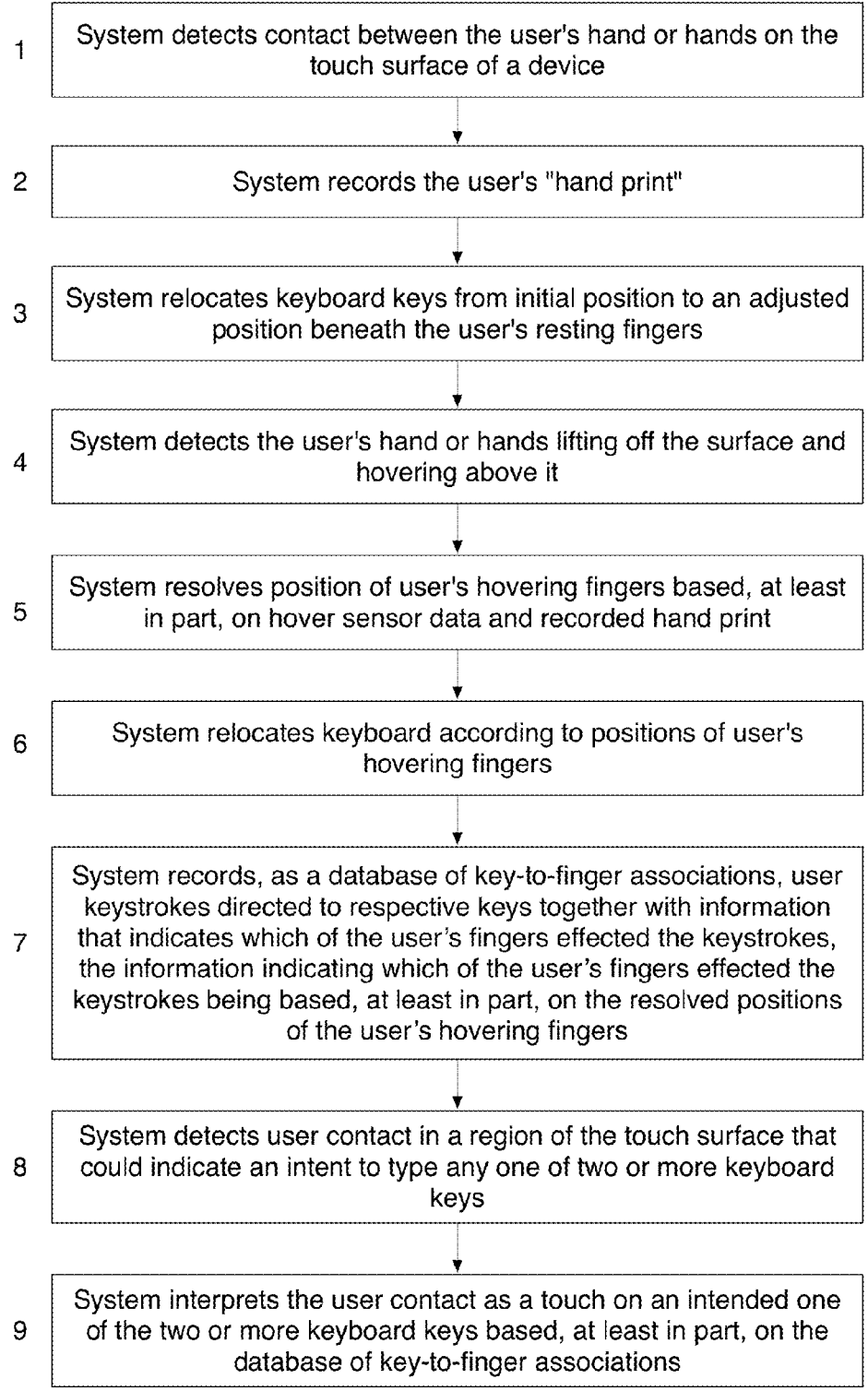
FIG. 1 is an overview of the sequential actions taken by the system according to one embodiment during a typical user interaction of typing.

In a number of embodiments disclosed herein touchscreen typing is improved by dynamically positioning displayed keys below a user's fingers while the user's fingers are hovering above the touchscreen surface, thus improving typing accuracy and rendering it unnecessary for the user to look at the keyboard before starting to type. In other embodiments, touchscreen typing is further improved by generating a database of finger-to-key associations, and using that database to resolve an otherwise ambiguous user touch to an intended keystroke. The database of finger-to-key associations may be generated, for example, by identifying positions of a user's hovering fingers prior and applying the finger identifications in recording which of the user's fingers is used to stroke respective keys of a displayed keyboard.

The locations of each of the user's fingers while hovering above the surface are determined by using a hover detection system that may also be combined with user-specific hand print information. This hand print may be used, alone or together with other information, a user's home-row position and is established by using touch sensors to measure and capture the finger locations relative to each other when a user rests their hands on the touch surface. Correlation between the hover sensor data and touch sensor data increases the confidence level by which the system can tell which of the user's fingers were used to select a key. By knowing which finger was used to make the selection, the system can more accurately disambiguate which letter the user intended to type.

First, the system determines the location of the user's fingers, which may be hovering above the touch surface, resting on the touch surface, or a combination of both resting and hovering.

Next, the system may automatically position the home-row keys of the onscreen keyboard directly below the hovering or resting fingers by comparing the location of the fingers with the pre determined user's home row position, defined as the user's "hand print". (This feature may be set as a user option).

Next, the system determines the typing style of the user: two-finger typist, full touch-typist (8, 9, or 10 fingers), or hybrid typist (3, 4, 5, 6, or 7 fingers). The system then maps keys of the keyboard to the specific fingers of the user that are used to type those keys. The default finger allocation may originate from a default allocation stored by the system, but the system may also learn from the typing style of the user and adapt the finger allocation table dynamically. The finger allocation table for each specific user may be stored in a database and used by the system to form a set of typing characteristics called a "Type Print" used to identify a specific user (analogous to a fingerprint). See, for example, U.S. patent application Ser. No. 13/485,802, filed May 31, 2012 (entitled "System for Detecting a User on a Sensor-Based Surface") which is hereby incorporated by reference in its entirety. This user-specific data may be stored locally on the device or in the "cloud." The keys of the keyboard may or may not be visibly displayed to the user. In a preferred embodiment, the keys remain virtual and invisible on the display so-as not to obscure other graphical information depicted on the display.

Next, the system continuously tracks the location of each of the user's fingers and correlates which finger was used to perform key actuations on the onscreen keyboard. The continuous tracking of each finger location takes place when the fingers are hovering above the touch surface, resting on the touch surface, or a combination of both.

When a keystroke is made in an unambiguous way and the user is deemed to have accepted the input by not backspacing or correcting it, then the system records which finger was used to make that selection. This information is stored in a database and may be used later to help disambiguate other keystrokes.

When an ambiguous key selection takes place, the system determines which finger was used to make the selection, references the pre-stored database to determine what keys were previously typed with that finger, and then uses that information to disambiguate the key selection.

Note that this process may also work in reverse. If the system is unable to make an unambiguous determination as to which finger was used to make a key selection, it refers to previous selections of that same key and infers from that historical record which finger was most likely used to make the current selection.

Overview of an Embodiment

FIG. 1 provides an overview of the sequential functioning of the present invention. It begins by a user approaching a touch-screen device with the intention of interacting with it. In one embodiment, the user may wish to type on the screen of the device using an onscreen keyboard. The user begins by resting their fingers on the surface of the device in an area designated for the onscreen keyboard. The system recognizes this "set-down" gesture and automatically forms the keys of the onscreen keyboard beneath the user's fingers, with preference being given to placing the home keys (F and J) beneath the user's index fingers. The system also takes note of the physical characteristics of the user's hands—the size and spacing between their fingers, among other parameters—and stores this information as the user's "hand print".

Next, the user typically lifts their hands off the surface of the device and begins to type. Many users tend to hover their fingers slightly above the keys of the onscreen keyboard as they type, interspersed with occasional rests on the surface. As the user hovers their fingers above the surface, the system determines the location of each of the user's fingers either directly from the hover sensor data (if it is accurate enough) or it references the user's hand print to interpolate the location of each finger.

The system continues to track each of the user's fingers as they type, hover, set-down, rest, and so on. As keys are selected, the system learns which fingers were used to make said selections and stores that information in a database ("finger-key" database). In cases when the key selection is ambiguous (unclear which key the user intended to select—hitting between two keys, for example), the system refers to the finger-key database to help disambiguate the key selection.

If, for example, the user ambiguously touches the onscreen keyboard between the "i" and "o" keys with their middle finger, the system refers to the finger-key database to determine that the user most often selects the letter "i" with their middle finger (and "o" with their ring finger). So in this example, the system would significantly increase the probability that the intended key of the ambiguous selection is the letter "i". Thus, the hover detection and finger tracking system can greatly enhance the accuracy of a user's typing experience Determining Finger Location The location of a user's fingers can be determined in a number of ways. In one embodiment, the location of the user's fingers is determined by a touch sensor (or array of touch sensors) as the user rests their fingers on a touch-sensitive surface. Information such as hand anatomy, the size and relative locations of finger touches, the strength of the finger set-down, and the weight of each finger can all provide clues as to accurately determine which finger is which. In this case, the touch sensor may be capacitive, force sensing, optical, or any number of commonly used touch sensing methodologies.

In yet another embodiment, the location of the user's fingers is determined by a hover sensor (also referred to as a proximity sensor) as the user's fingers hover above a touch-sensitive surface. The hover sensor detects the presence of human hands and fingers a reasonable resting distance above the touch surface. The hover sensor may be capacitive, optical, or any number of commonly used proximity sensing methodologies.

In a one embodiment, for example, the location of the user's fingers is determined both by a combination of the user resting on and hovering their fingers above the touch surface.

Many touch capacitive systems are now capable of projecting their fields far enough above the surface that capacitive objects in close proximity can be sensed without the objects actually touching the surface. The same can be said for other types of touch sensors, including (but not limited to) imaging, optical, infrared, temperature, thermal imaging, and standing acoustical wave (SAW) sensors.

In a number of embodiments, the touch sensor is a capacitive sensor capable of projecting its sensing a spatial region well above the touch surface, and is thus sufficient to detect the presence of a user's fingers hovering above the surface: both individually and as a group. It is common for the accuracy of the capacitive touch sensor to decrease as the user's fingers move further from the touch surface. In some cases, the capacitive sensors may not be able to discern each individual finger, but instead senses only a general area comprised of all the fingers of a hand. In this case, the system may apply known factors of human anatomy and the relative size/location of each finger in order to estimate the location of each finger.

In another preferred embodiment, other types of sensors may be used to accurately determine the location of each individual finger, including, but not limited to: imaging, optical, infrared, temperature, thermal imaging, and standing acoustical wave (SAW) sensors.

Fingers may also be uniquely identified, for example and without limitation, by: (i) the size of touch impression they leave on the touch surface, (ii) the force with which they tap on the surface (the index finger can tap much harder than the little finger), (iii) their respective weights as they rest on the surface, (iv) which keys they are used to type on, and (iv) the relative placement of touches generated by each finger.

Figure 9:
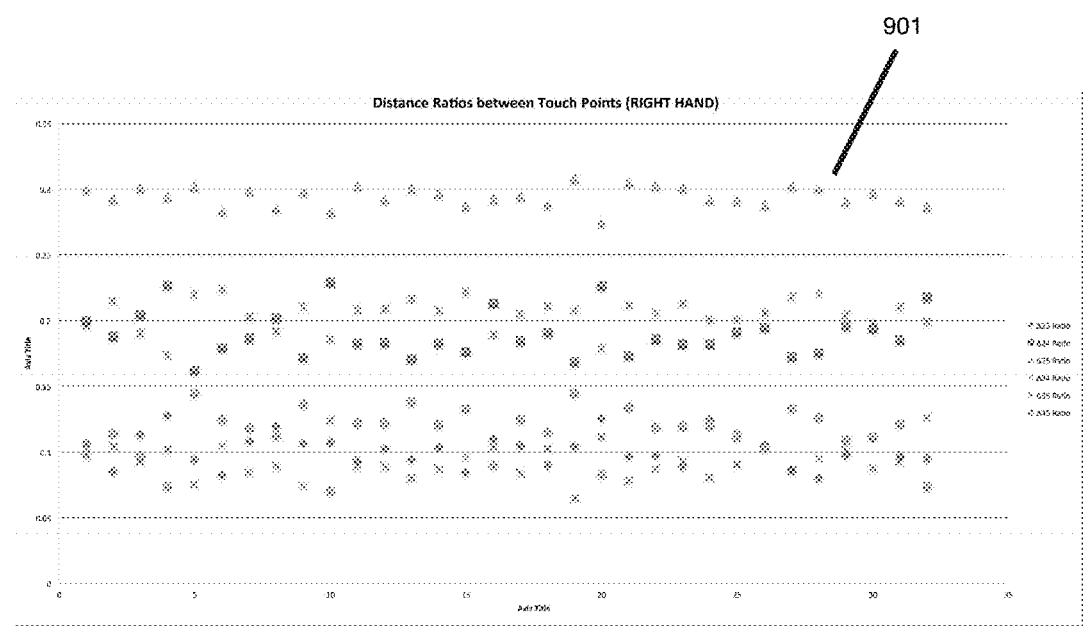
FIG. 9 is a sample plot of data collected from numerous human subjects showing the distance ratio between each finger pair.

Hand samples have been collected from numerous different ages and genders to form a database that models typical hand and finger sizes, and relative distances and angles between each finger pair. This hand model database can be used to help uniquely identify each finger being sensed, and even fingers that are missing from the sensor data. FIG. 9 is an example of one of the plots of data derived from 35 different hand samples. It shows the "distance ratios" between each finger pair (defined as the distance between the two points divided by the total distance between all points). There are many different metrics involving distance, angles, rotation, and orientation stored in the hand model database.

In one embodiment, the system requires the user to simultaneously rest either 3 or 4 fingers per hand to define a "set-down event". During a set-down event, the keyboard relocates to the user's finger position and the user can slide the keyboard around the screen by dragging their fingers. FIGS. 5A through 5F show the different three and four finger combinations that can result in a set-down event. The fingers are numbered as follows: 1 (thumb), 2 (index), 3 (middle), 4 (ring), and 5 (little finger).

Setting Home-Row Position

An important aspect of touch-typing is the "home row" of the onscreen keyboard. These are the keys upon which the user is trained to rest their fingers in order to orientate their hands properly on the keyboard. On a conventional mechanical keyboard, the keys rested on by the index finger of each hand (typically the "f" and "j" keys) usually have a small tactile marker that the user can feel to help them find the home row without looking.

In the instance when the system is implemented on a solid touch-sensitive surface (such as a touchscreen on a tablet computer), it may be difficult to provide the user with a tactile marker on the home keys. Instead, the system may move the home row under the user's fingers. See, for example, U.S. patent application Ser. No. 13/308,416 filed Nov. 30, 2011 (entitled "Dynamically Located Onscreen Keyboard"), which is hereby incorporated by reference in its entirety.

It is not necessary for all fingers to be touching the surface concurrently in order to determine the home row position. The location of the home row is dictated by the location of the "home keys" F and J. In a preferred embodiment, the locations of the left and right home rows, and thus keyboard halves, are determined independently. Even if the index finger (typically associated with the home keys) is not resting, its approximate location can be determined using the other fingers that are touching and applying known metrics of human anatomy derived from the aforementioned hand metrics database.

A home-row definition event may take place by either the user resting their fingers on the surface for a prescribed amount of time, or by the user hovering over the keys with their fingers for a prescribed amount of time. In both cases, the location, size, and orientation of the onscreen keyboard is determined according to the location of the user's fingers.

The term key is defined herein to be any depiction of an object occupying a geographic area on the touch screen on which the user may make a selection.

The term keyboard is defined herein to be any collection of one or more keys. It need not be the standard qwerty keyboard commonly used for typing text. For example, it could also include onscreen controls displayed on a touchscreen in an automobile for controlling audio and climate settings.

Determining Typing Styles

Studies have shown that roughly 30% of typists use eight, nine or ten fingers ("touch typists") and less than 5% use only two or three fingers. The remaining 65% are hybrid typists who use 4, 5, 6, or 7 fingers. Models for each of these typing styles are stored in a database and the system constantly analyses the typing style of the user to determine what category of typist they are. Once identified, these models can be used to determine which finger is used for which key, and thus contributes to the disambiguation algorithms as described herein.

The typing style of users can vary greatly, and often becomes very unique for each individual typist. The system described herein can learn and adapt to each user's typing style. When a key is unambiguously selected, the system correlates which finger was used for that selection and stores it in a database. Multiple entries for each key may be stored to determine the most likely finger used to select that key in different circumstances (since different fingers may be used for the same key in difference circumstances). In this way, the system can become tuned to each user's particular typing style and become more and more accurate over time. A user's typing style profile may be stored in a database and selected by the user manually, or automatically applied once a particular user's typing style is identified by the system. In a preferred embodiment, the typing style "signature" of a user may be stored in the cloud (remotely stored via the internet). The system may detect the characteristics of the user typing on a given device, compare those characteristics with the database stored in the cloud, identify the user, and load their specific settings (including language databases, word lists, and so on).

In another embodiment, the computer processing for identifying the user's typing style, disambiguating keystrokes, and other processor-intensive tasks can be performed in the cloud. The raw touch, tap, hover, and other sensor data is transmitted to a remote processor in the cloud via a network or internet connection, where it is processed and results returned to the local device in the form of instructions, keystrokes, or other commands.

Even the same user can have varying typing styles. For example, a touch-typist may injure a finger and be unable to use that finger to type for a period of time while the finger is healing. The human body is highly adaptable, and the user would likely change their typing style to avoid using the injured finger and quickly become adept at the new modified typing style. So, it is important that the system is able to dynamically adapt to changes in the typing style—even from the same user. It is able to do this by continuously tracking which finger is used to select keys and modifying the user's Typing Print accordingly. Emphasis is given in the algorithm to the more recent user actions.

Because it may take time for the system to learn a particular user's typing style, the user may speed up the process by performing an exercise to explicitly teach the system their style. In one embodiment, the user may type the phrase "The quick brown fox jumped over the lazy dogs"; a phrase that contains all 26 letters of the English alphabet. As the user types the phrase, the system records which finger is used for each letter. Of course, other more involved methods of calibrating exercised could be employed.

Tracking Finger Location

Figure 3:
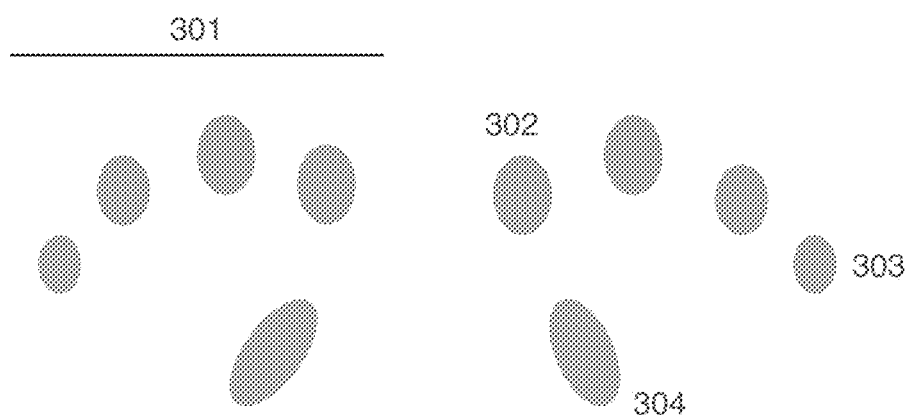
FIG. 3 is a visual representation of typical touch points created by a user resting all fingers and thumbs of the left and right hands uniformly on a touch screen.

The system tracks the location of each individual finger of the user. This is simple when all ten digits are resting or hovering on or above the touch surface. A depiction of the touch sensor output is shown in FIG. 3. The four fingers and thumb of the left hand are accurately shown as 301 in FIG. 3. The right hand index finger is shown as 302 and a smaller touch signature is shown as the little finger at 303. The opposed thumb is shown at a slightly different angle as it rests on the touch surface at 304.

Figure 2A:
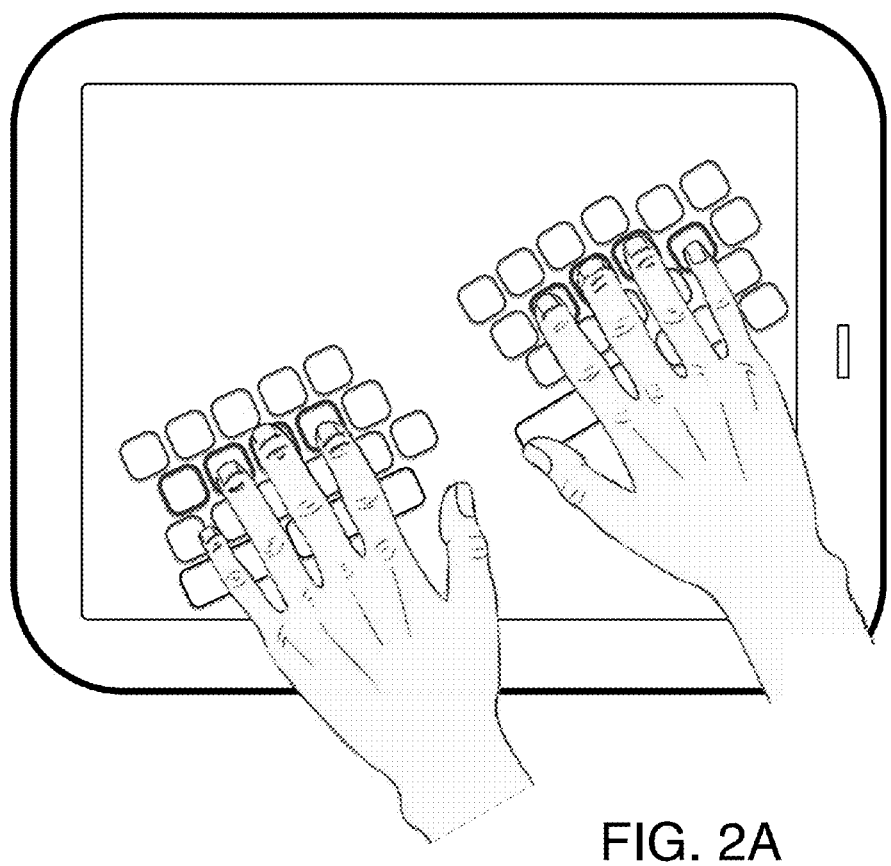
FIG. 2A is a schematic view of a preferred embodiment of a portable computer with a touch-screen display on which a keyboard system of the present invention is displayed.

FIG. 2A illustrates a typical user typing on the touchscreen of a mobile device. Note how the hands don't have to be aligned with the edges of the device; rather, the onscreen keyboard appears at whatever angle the hands are placed. On smaller devices, this provides the advantage of more screen space for the user's hands when placed on a diagonal setting as shown in FIG. 2A.

Figure 2B:
FIG. 2B is the same view showing touch points created by the user resting their fingers and hands on the touch surface.

FIG. 2B illustrates the signals received by the touch sensors of the touch surface rested on by the user's hands in FIG. 2A. The darker the shape, the stronger the touch signal received. FIG. 2B suggests that the left thumb and right palm are lightly resting on the surface, while the other digits are in firm contact with the surface.

Figure 4:
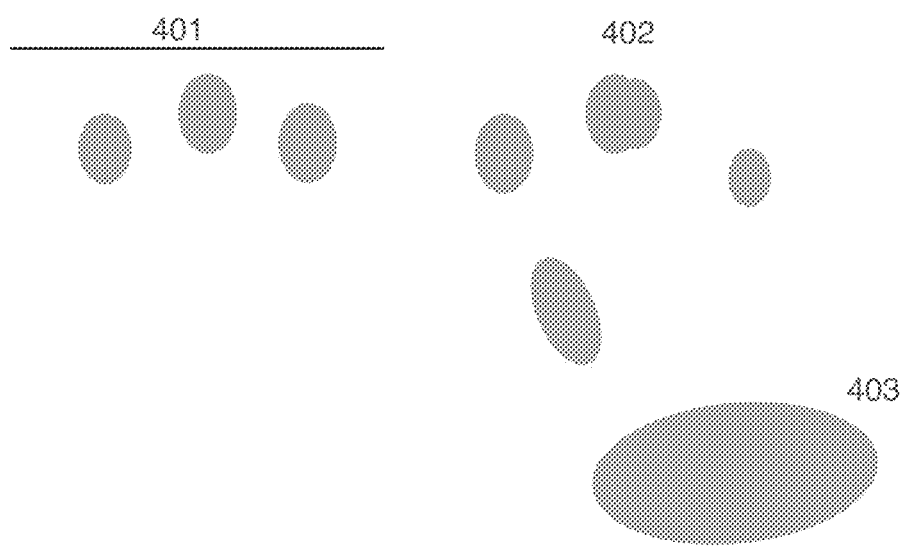
FIG. 4 is a visual representation of touch points created by a user resting their hands and fingers in a non-uniform manner on a touch screen.
Figure 5A:
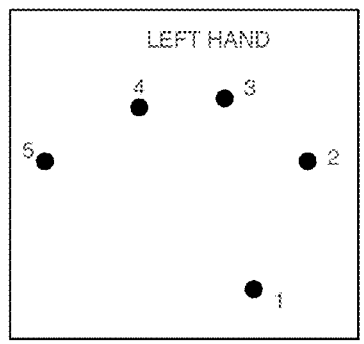
FIGS. 5A through 5F shows the typical positioning of human fingers for the left and right hands as they are resting on a touch surface in varying finger combinations.
Figure 5B:
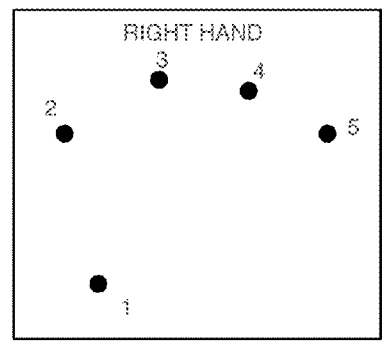
Figure 5C:
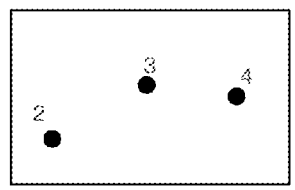
Figure 5D:
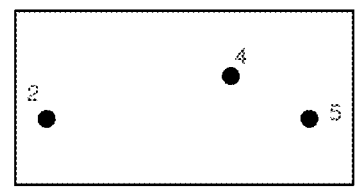
Figure 5E:
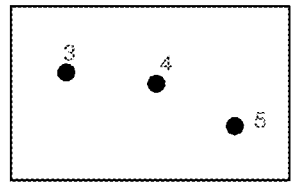
Figure 5F:
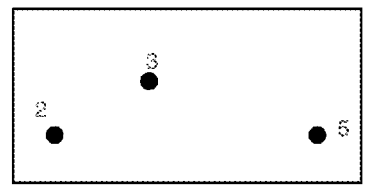

But it is often the case that the user may curl their fingers, lift some higher than others, actually be missing fingers, or a myriad of other circumstances that results in not all ten digits being detectable at any given time by the system. FIG. 4. illustrates how the left hand at 401 registers only 3 fingers. The middle and ring fingers of the right hand are shown overlapping at 402. A large touch region caused by the user resting their right palm on the touchscreen is depicted at 403. The system must be able to discern these anomalies in order to correlate touch locations to fingers.

Figure 8A:
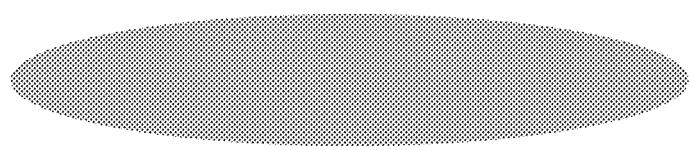
FIGS. 8A and 8B is a simplified view of the touch signals that may be sensed as a user hovers the fingers of their right hand above a touch surface.
Figure 8B:
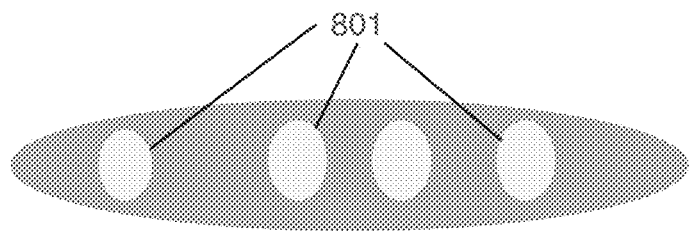

Image recognition algorithms may be applied to each of the registered touch locations. Parameters that may be used to determine the mapping of fingers to the sensed touch regions include:

Area of the touch region
Shape of the touch region
Strength of the touch signal
Relative location of the touch region to other touch regions
The absolute location of the touch region on the touch surface
The location of the touch region in relation to the onscreen keyboard (and keys in that area that have specific finger mappings)
Historical placement of previously determined fingers on or near the location of the touch region
Horizontal placement of the touch region on the touch sensor
Vertical placement of the touch region on the touch sensor
Other parameters specific to the touch region In the case of fingers hovering above the touch surface, the touch regions may combine into a single region as shown in FIG. 8A. In this case, the system may apply knowledge of human anatomy to estimate the placement of each finger. In FIG. 8B, 801 shows each individual finger estimated from the combined touch region, with the pointer finger separate slightly from the other three fingers (as is typically the case with fingers in a resting position).

Finger identification may also be performed using unambiguous keystrokes. (This is the reverse of the key disambiguation algorithm described in the next section). When a key is selected unambiguously, the system uses the finger-mapping for that key to help determine which finger was used, and then continues to track the touch region associated with that finger subsequent to the key selection.

Disambiguation by Using Finger Selection

Figure 10:
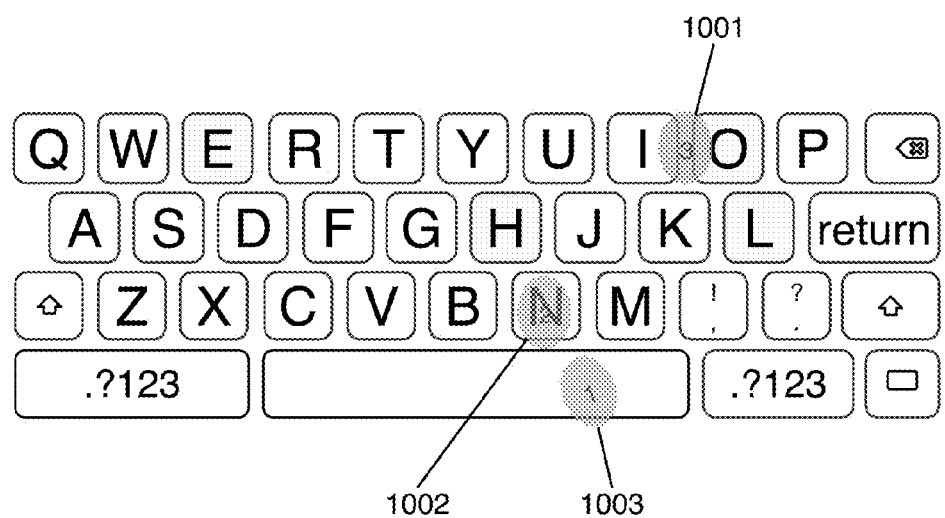
FIG. 10 is a depiction of an onscreen keyboard on which the word "in_" is ambiguously typed.

FIG. 10 illustrates an ambiguous text input stream on an onscreen keyboard. The user begins by ambiguously selecting between the i and o keys at 1001, followed by an unambiguous selection of the letter n at 1002, and finally an unambiguous selection of the space key 1003. Using conventional word prediction techniques, it would be very difficult to determine if the user meant to type the word "in" or "on", since both are very commonly used words.

But the system described herein is able to accurately disambiguate the typing pattern because of its knowledge of which finger was used to type each key (finger 3 (middle finger) for the first selection at 1001, finger 2 (pointer or index finger) for the selection at 1002, and finger 1 (the thumb) for the selection at 1003.

Assuming in this case that the user was a touch typist (previously determined by the system based on user typing style), the system maps the ambiguous touch 1001 made using the middle finger to the key representing the letter "i", since that key is typically selected using the middle finger by touch-typists. Armed with that information, it becomes a simple matter for the system to determine that the user intended to type the word "in".

The foregoing example illustrates the benefit of knowing which finger was used to make a selection in helping to disambiguate inaccurate typing.

There are numerous statistical techniques that may be applied in combination with (or as alternatives to) the foregoing to improve accuracy of the finger location and touch location data. What is described above is a simplified version intended for explanatory purposes, and the spirit and scope of the various embodiments disclosed herein are in no way intended to be restricted to the foregoing examples.

The Benefits of Hover Sensing

Many typists position their fingers just above the keys of a keyboard while typing. The ability to sense a user's fingers above a touch surface greatly enhances the touch-typing experience in a number of ways. First, as previously mentioned, the position of the keyboard halves can be defined by the location of the hovering fingers. In particular, the index fingers define the location for the home-keys "F", and "J". Secondly, by tracking hovering fingers, the system can make a more accurate calculation as to which finger was used to make a key selection. As a hovering finger approaches the keyboard and eventually touches it, the touch signal gets stronger.

Figure 7A:
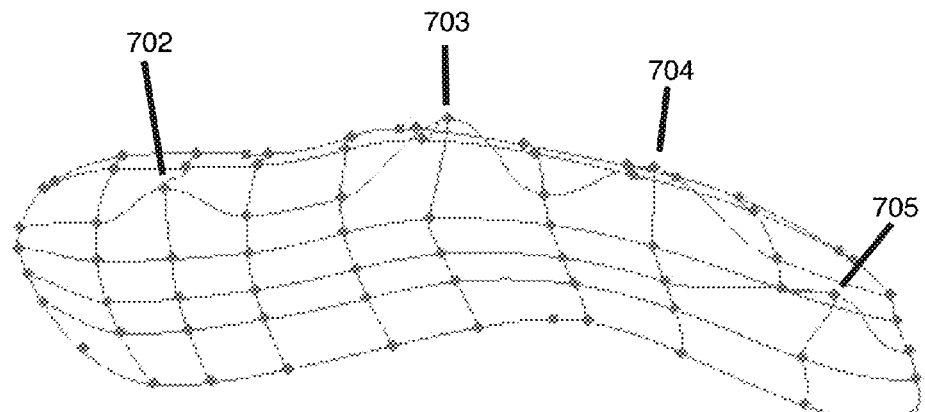
FIGS. 7A and 7B is a visual representation of the touch signals that may be sensed as a user hovers the fingers of their right hand above a touch surface.

FIG. 7A is a visual depiction of what a touch capacitive field might look like with a user resting the fingers of their right hand just above the surface. The slightly raised areas marked 702 through 705 represent the user's fingers (index, middle, ring, and little finger respectively). Note how the area 703 representing the middle finger has a slightly stronger signal since the middle finger typically is the longest and would rest closer to the surface.

Figure 7B:
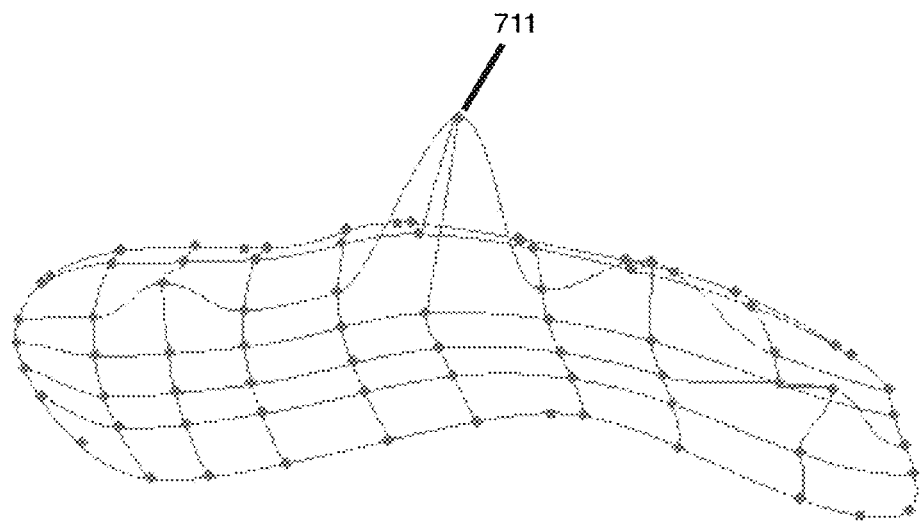

FIG. 7B is a visual depiction of the middle finger moving closer to the touch surface and thus results in a stronger touch signal at 711. When a key selection is made at or near the location associated with the right middle finger, the hover detection data can correlate that indeed, the key selection was made by the middle finger. As previously described, knowing which finger was used to select a key can greatly enhance the disambiguation process.

Another common problem with rest and type touch keyboards is discerning between when a user is setting their hands down to rest on the surface as opposed to when they are typing. It is often very difficult to know the difference during the initial set-down period if only the touch sensor data is available. It is common for "false positive" key events to take place during a set-down event. Hover sensor data can greatly help to solve this problem. The hover sensors can report that all fingers are approaching the surface more or less simultaneously and can advise the system that a set-down event is imminent. This eliminates the problem of false-positives during set-down events.

Figure 12:
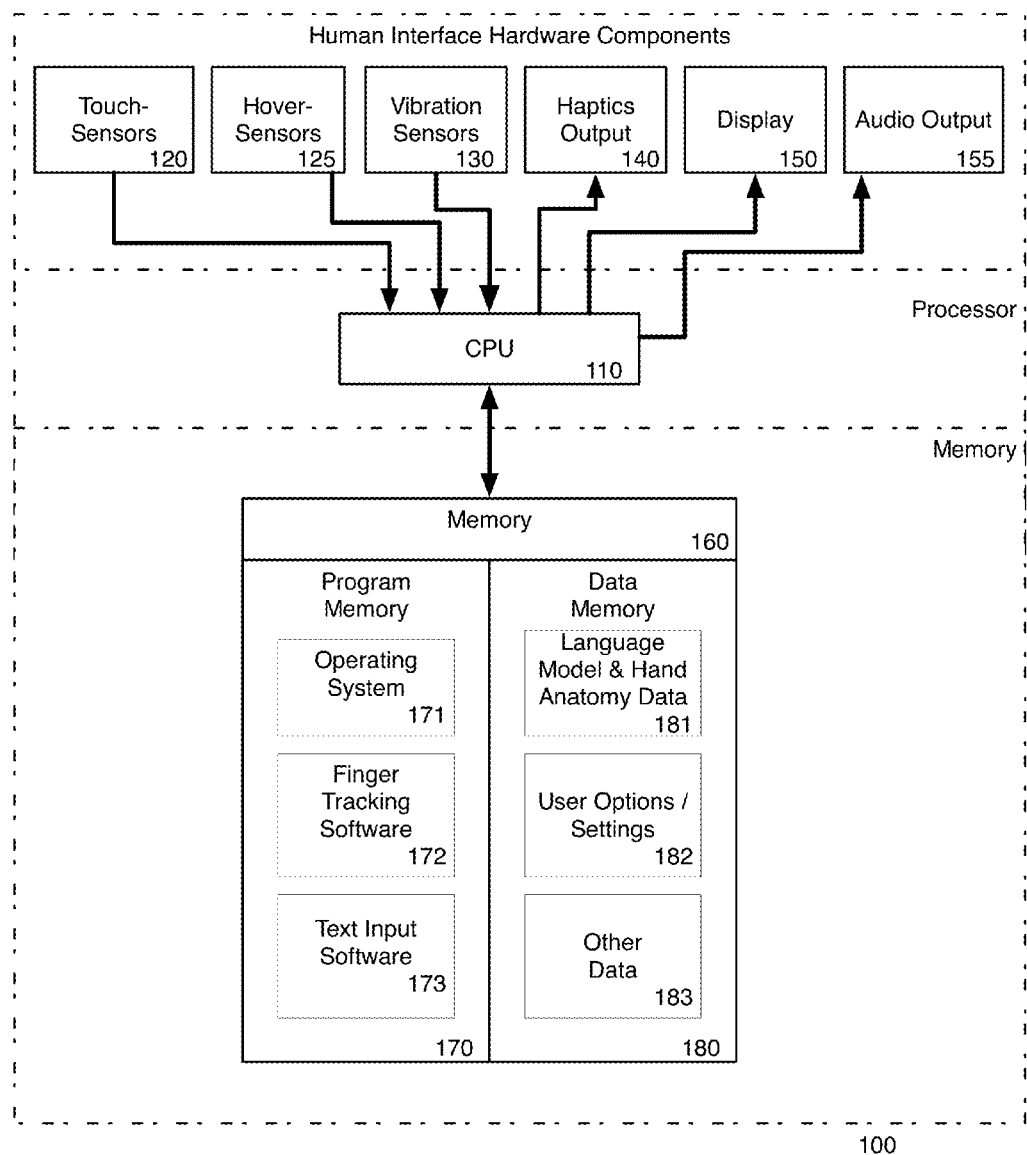
FIG. 12 is a hardware block diagram showing the hardware components of a system in which various methods and techniques disclosed herein may be implemented.

FIG. 12 shows a simplified block diagram of the hardware components of a typical device 100 in which the foregoing methods and techniques may be implemented. The device 100 includes touch sensors 120, proximity sensors 125 and vibration sensors 130 which provide input to the CPU (processor) 110 notifying it of events when the user's hands are near or touching the screen, typically mediated by a hardware controller that interprets the raw signals received from the sensors and communicates the information to the CPU 110 using a known communication protocol via an available data port. Similarly, the CPU 110 communicates with a hardware controller for a display 150 to draw on the display 150. A speaker 155 and haptic output 140 is also coupled to the processor so that any appropriate auditory or vibration signals can be passed on to the user as guidance. The processor 110 has access to a memory 160, which may include a combination of temporary and/or permanent storage, and both read-only and writable memory (random access memory or RAM), read-only memory (ROM), writable non-volatile memory such as FLASH memory, hard drives, floppy disks, and so forth. The memory 160 includes program memory 170 that contains all programs and software such as an operating system 171, a Finger Identification for Text Input software 172, and any other application programs 173, such as text input software. The memory 150 also includes data memory 180 that includes the word database(s) 181 required by the Finger Identification for Text Input software 172, storage for maintaining a record of user settings and preferences 182, and any other data 183 required by any element of the device 100.

FIG. 2A is a schematic view of a preferred embodiment of a portable computer with a touch-screen display on which a keyboard system of the present invention is displayed. This illustrates the ability for a user to rest their hands on the surface at any angle. Using the system and methods of the present invention, the keyboard is able to form around the user's fingers.

FIG. 2B illustrates the likely touch sensor data that is received as a result of the hand position shown in FIG. 2A. Most touch sensor technology is now able to discern not only a touch, but the strength of the touch signal. In FIG. 2B, this is conveyed using different colors: the darker the color, the stronger the touch signal. In this example, the user is firmly resting all eight fingers, but their left thumb is hovering just about the surface resulting in a weaker touch signal. The same is true for the user's right palm.

In a preferred embodiment, touch capacitive sensors are employed. Using mutual capacitance, it is possible to have a high degree of location accuracy directly on the surface of the device by employing a larger number of sensors packed closely together. However, the signals must be relatively weak so-as not to spill over onto the adjacent sensors that are typically very closely situated. So, it was been a technical challenge to have both a high resolution touch surface that can also accurately sense objects in close proximity, but not touching.

Some inventions have sought to solve this problem using self-capacitance to project the field higher above the touch surface. The current state of the art can accurately sense a human hand or finger up to 20 mm above the touch surface. However, a limitation of self-capacitance is that it can only be single touch (otherwise "ghosting" can occur). Thus it is still a challenge for capacitive technology to provide both accurate touch and proximity sensing. But the state of the art continues to advance and will likely be able to accommodate both in the future.

There are many other methodologies besides capacitance that can also detect a human touch. These include optical sensing, infrared, sonar, standing wave, and many others. Many of these technologies can achieve accurate proximity sensing above the touch surface and would be suitable to provide the hover sensing necessary in the present invention.

FIG. 3 is an illustration depicting a user's fingers and thumbs resting uniformly on a touch surface. It is simple and intuitive to discern the individual fingers with such a clean image to work with. However, FIG. 4, shows how a user can easily rest their fingers in a non-uniform way. The present invention must still be able to identify and track the user's fingers—even when they are not all touching or arranged in a typical manner.

In a preferred embodiment of the present invention, the user is able to manually determine the location of the keyboard by setting down at least three fingers on each hand and resting them on the touch surface. This is defined as a "set-down event". During a set-down event, the user may drag the two halves of the keyboard independently. The location of each half of the keyboard is determined by locating the home keys (F and J) directly beneath the user's index fingers of the left and right hands respectively. Since a three-finger set-down is permitted, the system must still be able to identify the location of each finger—even if they are not all present.

FIGS. 5A through 5F illustrates the different combinations that three or four fingers can be set down. The system identifies each finger in all cases based on the relative location of each touch point. It does this from a database containing human hand anatomy information.

FIGS. 6A through 6G show a preferred embodiment of a software algorithm to implement the method of the present invention in order to determine the location of the onscreen keyboard, identify and track the user's fingers, and store associations between fingers and keys selected.

Figure 6A:
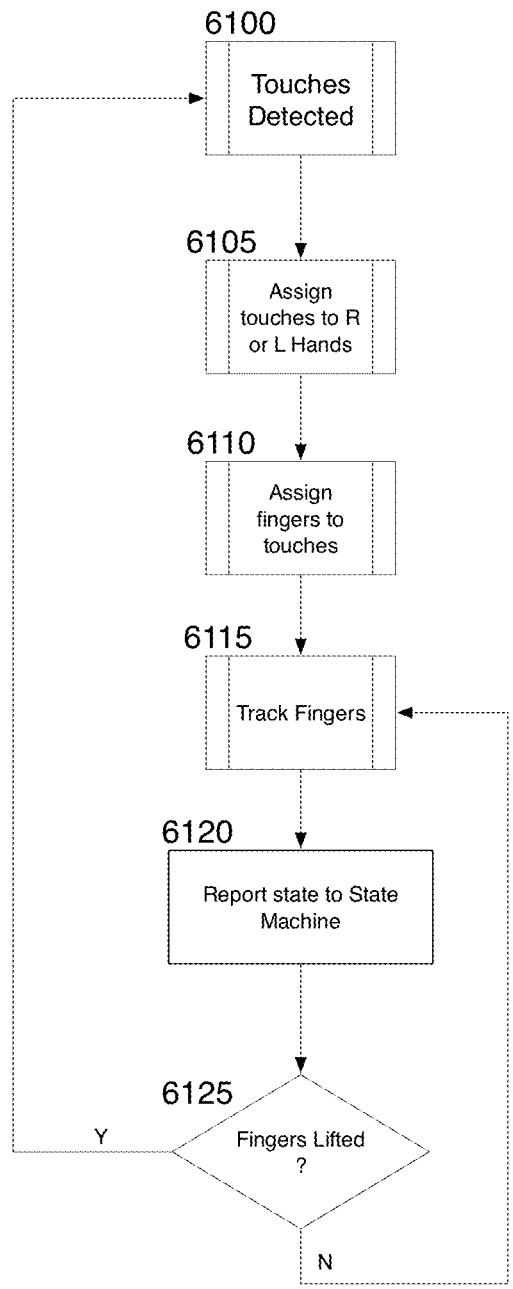
FIGS. 6A through 6G show an embodiment of a software algorithm to identify and track the fingers of a user resting or hovering above a touch surface.

FIG. 6A is a high level overview of what steps the system takes when actual touches are detected on the touch surface.

Figure 6B:
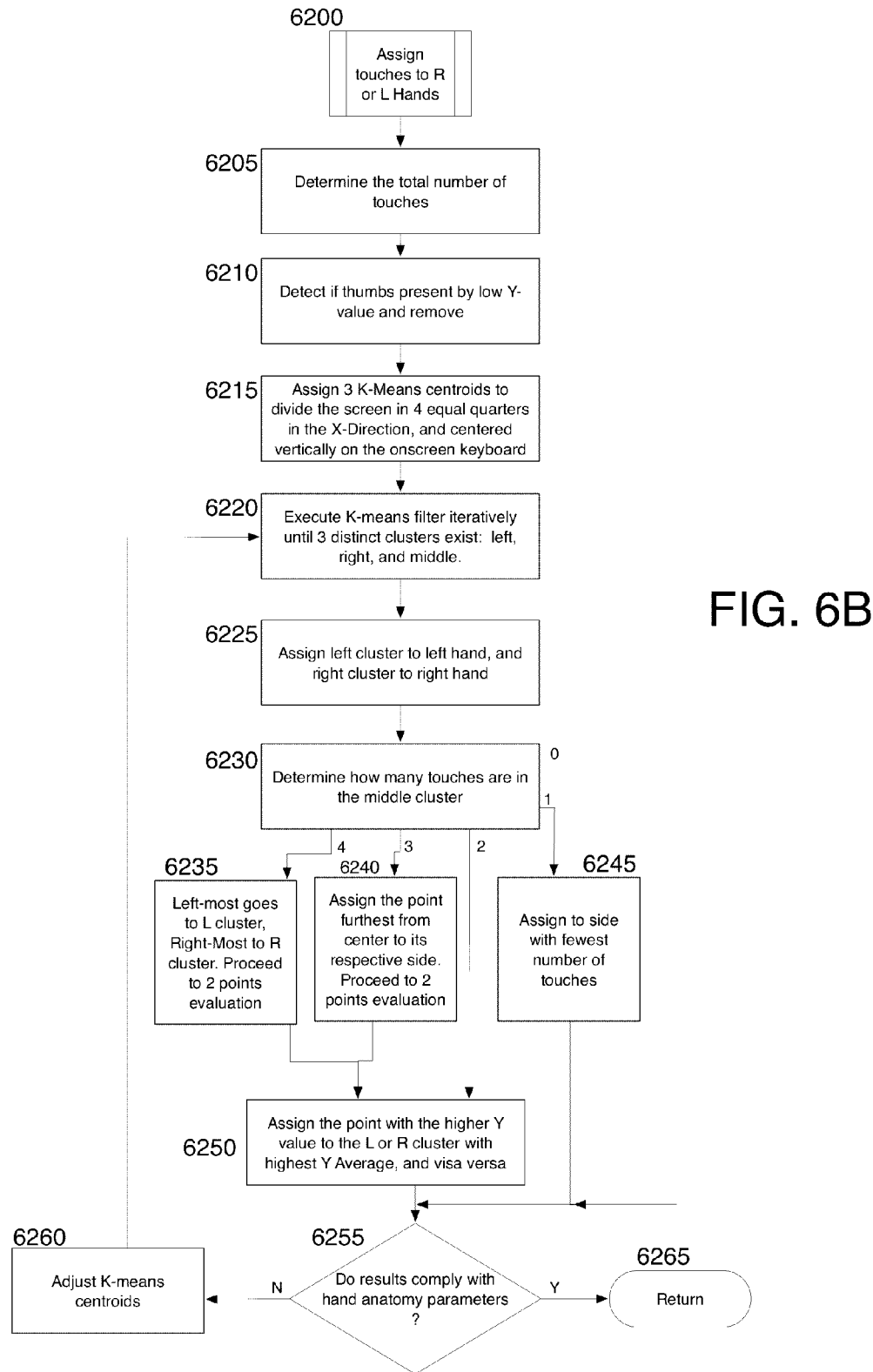

FIG. 6B describes an algorithm in which a commonly-known "K-Means" filter is applied iteratively to divide the touches into three regions: left, right, and middle. Logic and knowledge of human hand anatomy is then applied to assign the middle touches to either the left or right hands. The result of this step is all touches are assigned to either the left or right hand.

Figure 6C:
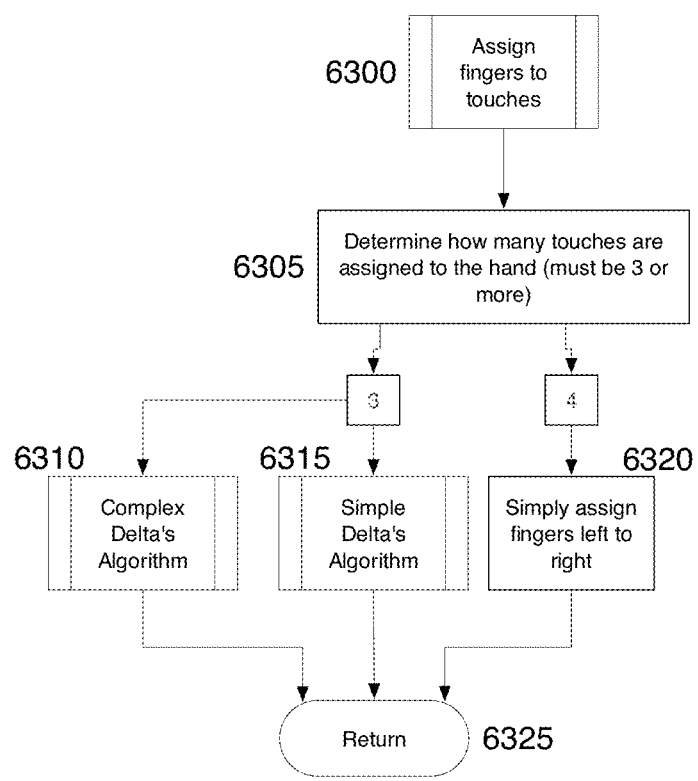

FIG. 6C is a high level overview of the steps taken by the system to assign touches to specific fingers of the user. In a preferred embodiment of the invention, either three or four concurrent touches are required for a valid set-down event. So the algorithm described in FIG. 6C considers only those two cases.

Figure 6D:
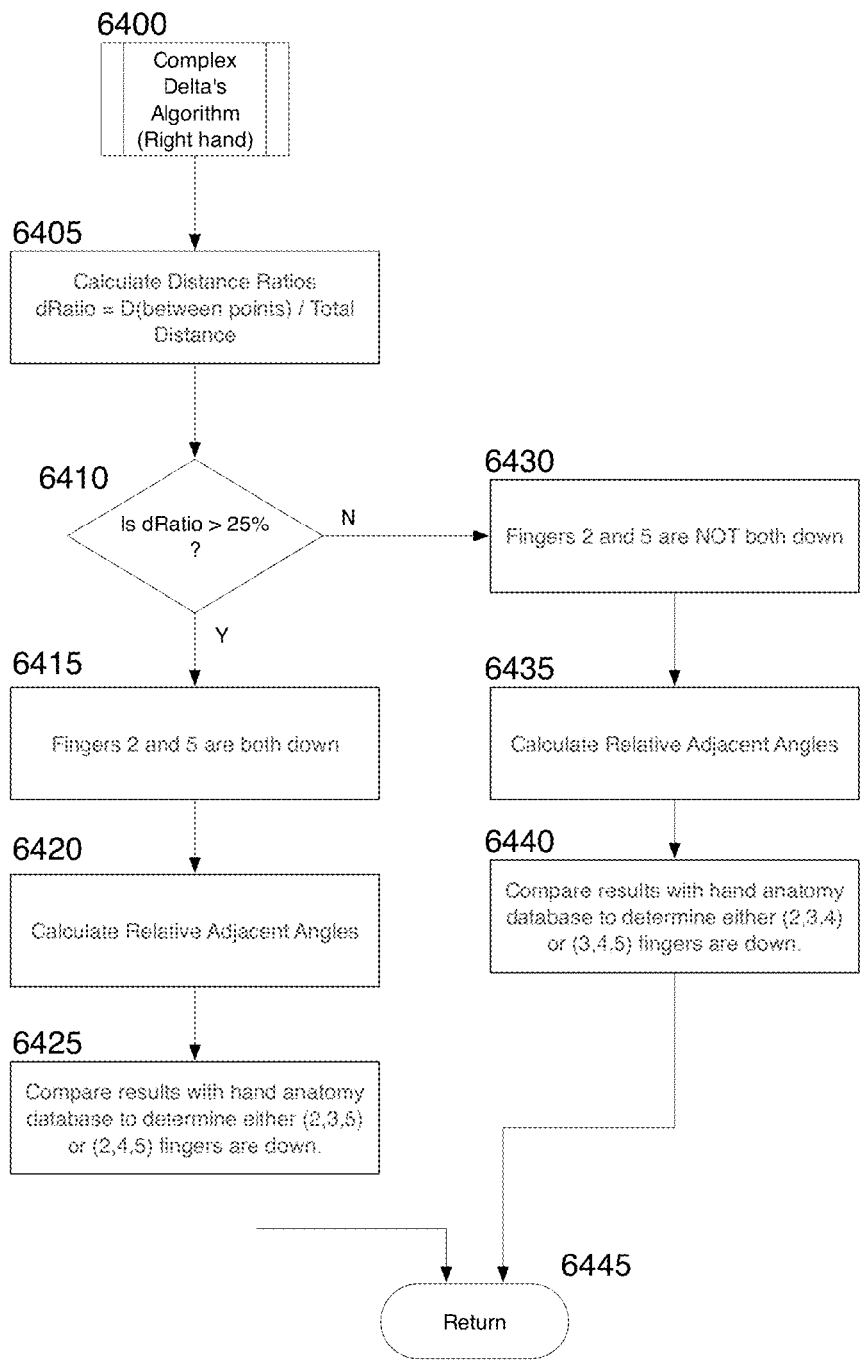

FIG. 6D describes a robust algorithm titled "Complex Deltas". The algorithm calculates the relative distance ratios between points defined as $$d\text{Ratio}=(\text{Distance between a pair of points})/(\text{Total Distance})$$

and also calculates the angle formed between each pair of points. These values are compared with "hand model" database containing parameters of typical human hand anatomy. An example of this data is shown in FIG. 9. The result of the Complex Deltas algorithm is the assignment of a specific finger to each touch point.

Figure 6E:
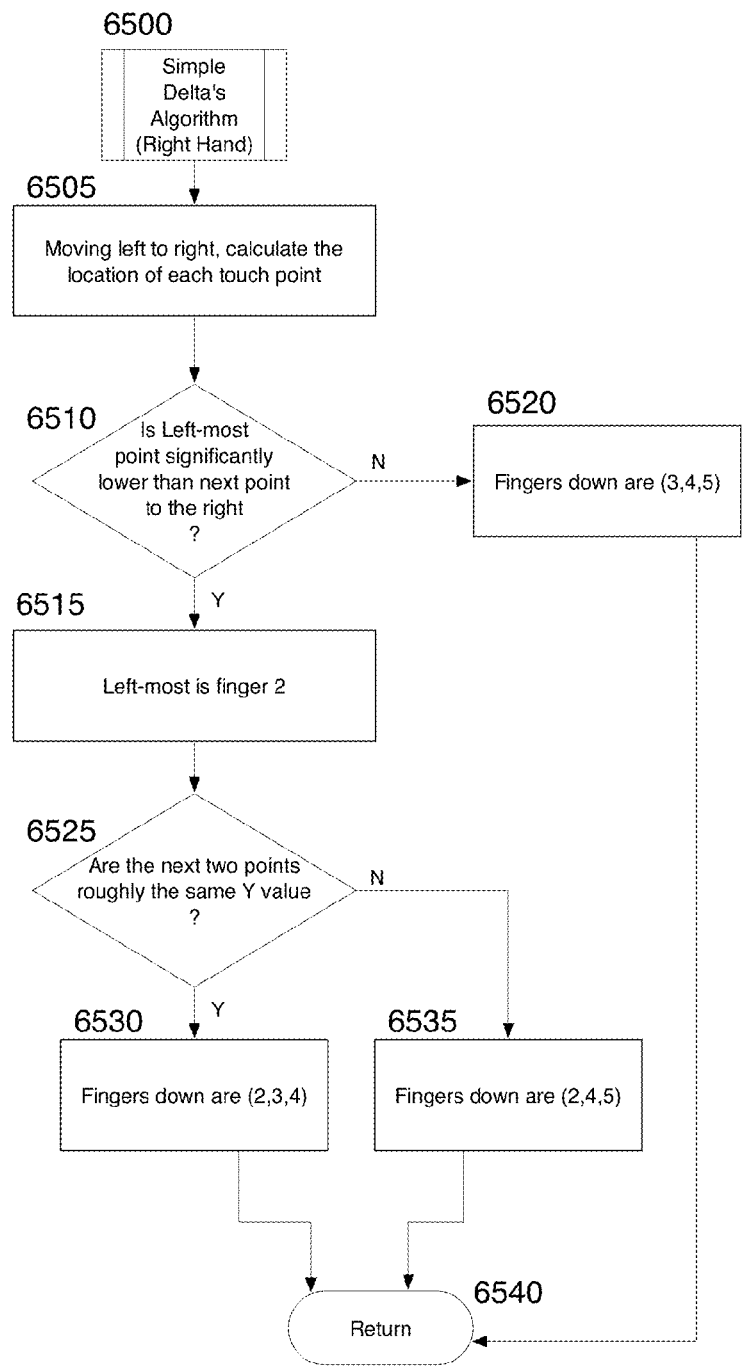

FIG. 6E describes a more general and simpler algorithm that accomplishes the same objective as the Complex Deltas algorithm with much less computing, but lower accuracy. However, in most cases this approach works well. Titled "Simple Deltas", the algorithm simply looks at the X and Y placement of each touch point in a very simple sense and takes advantage of the fact that most of the time, the index finger is placed lower than the middle finger, and so on.

Figure 6F:
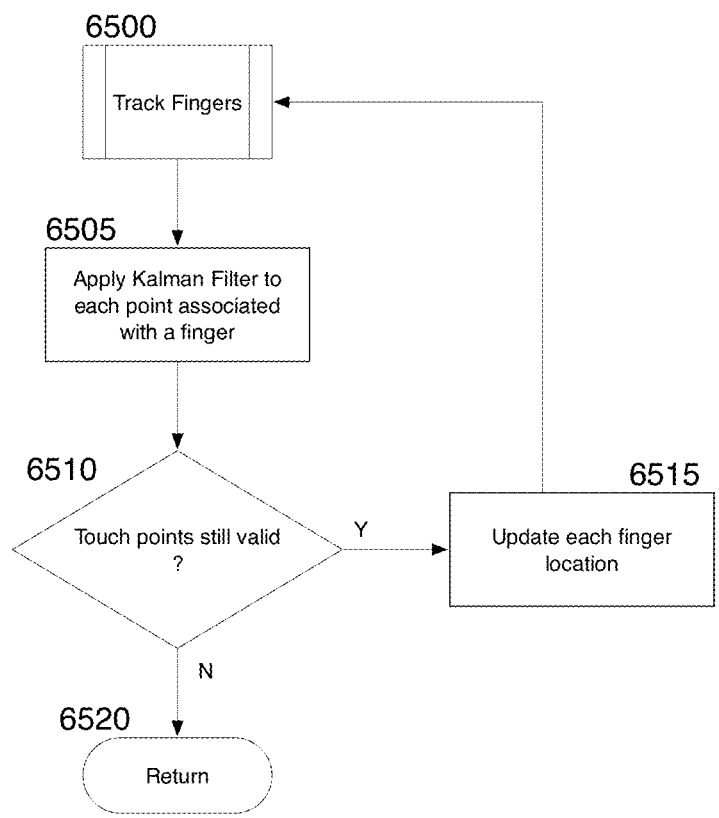

FIG. 6F describes an algorithm whereby a common Kalman filter is applied to track fingers as they move on the touch surface.

Figure 6G:
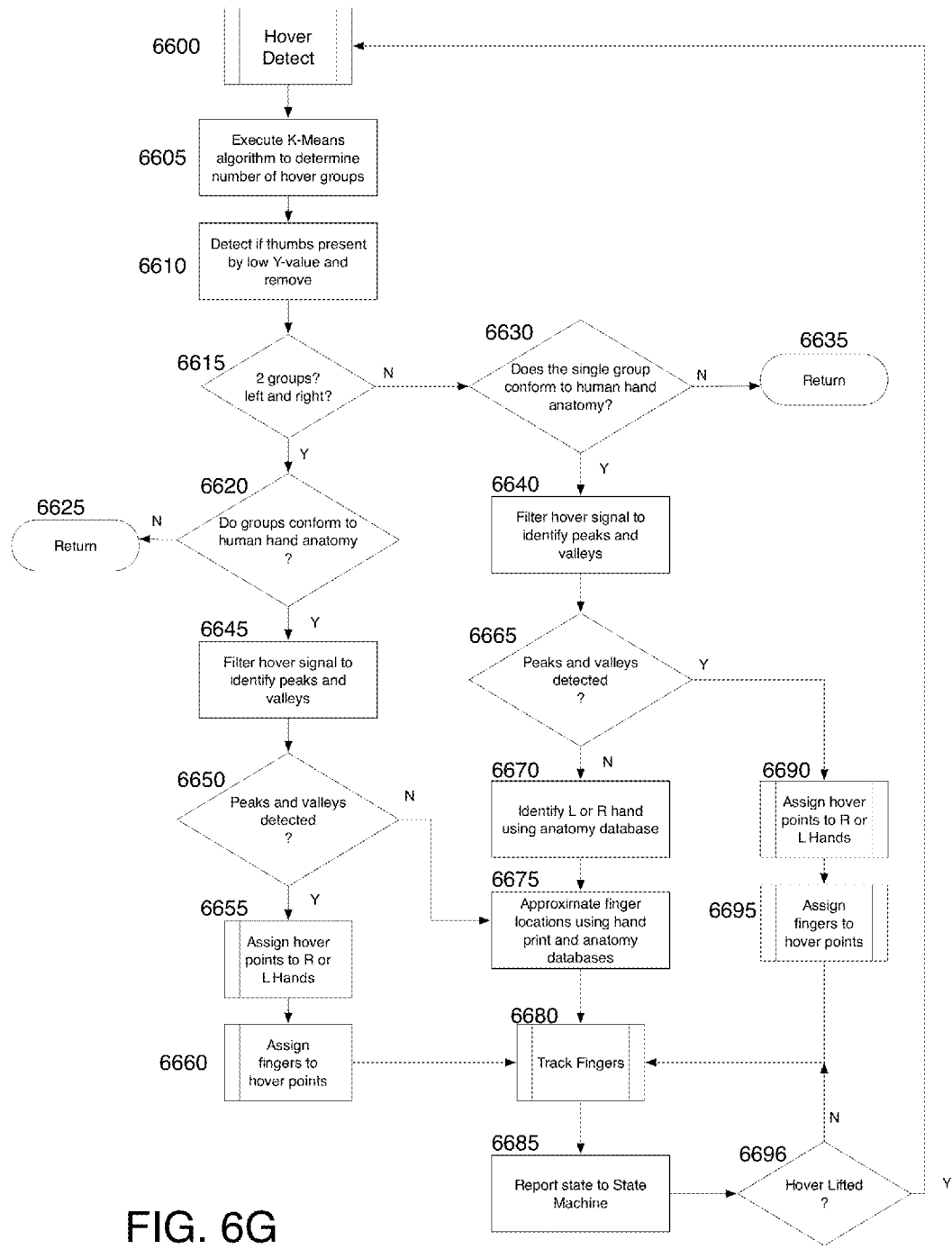

FIG. 6G describes, in detail, how the system identifies and tracks the user's fingers as they are hovering above the touch surface. Many of the same algorithms that are used for touch data are also used for hover data. The result of this algorithm is assignment of locations for each of the user's fingers.

FIGS. 7A and 7B are visual depictions of the proximity field captured by the hover sensors. In an ideal setting, the hover sensors can detect peaks and valleys associated with the user's finger locations (shown as points 702 through 705 respectively). In FIG. 7B, the middle finger is approaching the touch surface to select a key, and its proximity field is shown more pronounced at 711. In this way, the shape of the proximity field may change as the user is typing. The way in which the proximity field changes shape and location is directly correlated by the system to key selection actions.

FIGS. 8A and 8B are visual depictions of a proximity field in which the hover sensors do not provide detailed data as to the position of the user's fingers. In this case, the user's hand print information collected and recorded during set-down events is used, along with data from the hand model database, to interpolate where the user's fingers are most likely located within the proximity field (shown as 801).

FIG. 9 shows a sample of the data provided in the hand model database. In this plot, the distance ratio between finger 2 (index finger) and finger 5 (little finger) is shown as 901. As the plot shows, this data is nicely separated from all other distance ratios. Thus, if a distance ratio is found to be over 0.25, it can be assumed that the user has both their index and little fingers touching. Many other parameters including relative angles between each finger touch points are also stored in the hand model database. This information is used to verify measured data as well as interpolate finger positions when explicit measured data is not available.

FIG. 10 illustrates the benefit of knowing which finger is associated with touch events. In this example, a user has selected between the "i" and "o" keys with finger 3 (middle finger) at 1001, then selects the letter "n" with finger 2 (index) at 1002, and finally selects a space with their thumb at 1003. The first selection is ambiguous, since it is between the two keys. In this case, it is normally very difficult for the language model to determine which word the user intended: "in" or "on". Both words are very commonly used in very similar circumstances. Without any additional information, the auto-correct system will estimate and likely be wrong 50% of the time. However, with the system of the present invention, information is stored as the user types, which forms associations between letters typed and what finger was used to type them ("key-to-finger" database). In this example, the key-to-finger database reveals that the user is a ten-finger touch typists who commonly types the letter "i" with their middle finger, and the letter "o" with their ring finger. The system applies this information and assigns the letter "i" to the first character since it was typed using the middle finger.

The problem of inaccurate disambiguation is particularly acute on the qwerty keyboard layout where the vowels i, o, and u are each adjacent one to another. Words like put, pit, and pot become very difficult to tell apart if the second character is input inaccurately. The present invention solves this problem by recording unambiguous keystrokes when they occur and associating them to the user's fingers. Then, when an ambiguous keystroke occurs, the system is able to easily discern from the previously stored data which key the user really intended, based on which finger they used to select it.

Figure 11:
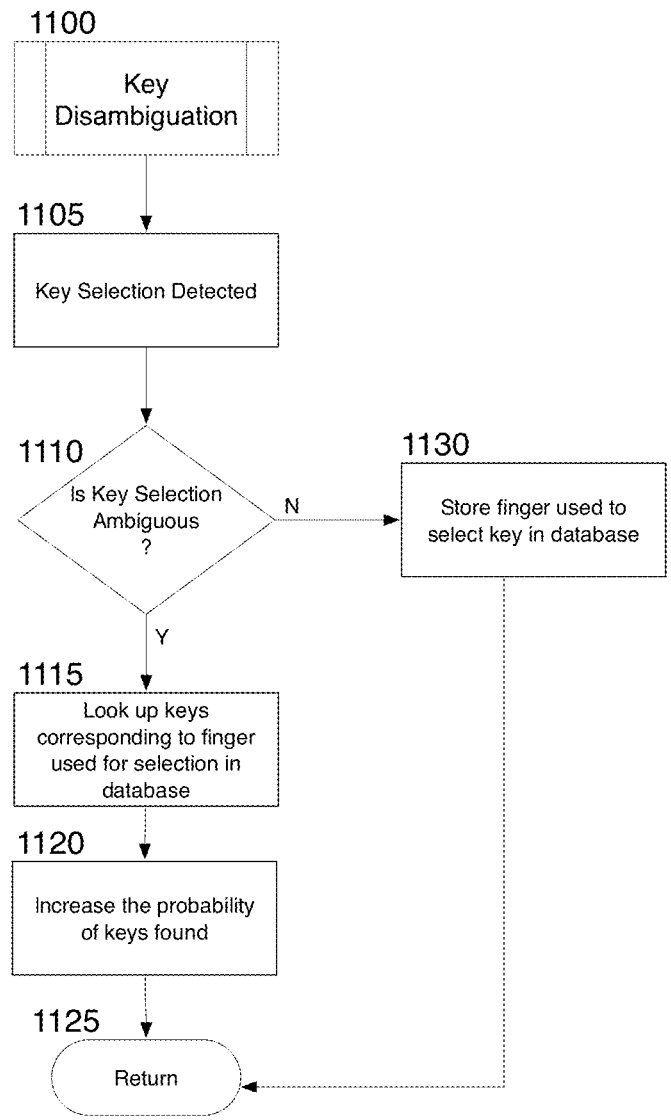
FIG. 11 shows a preferred embodiment of a software algorithm to store information indicating which finger is used to select keys in a database and then use that database to help disambiguate inaccurate typing.

FIG. 11 is a description of the algorithm whereby the key-to-finger associations are derived. Note that the system works both ways: first, it stores information in the database when an unambiguous key selection takes place. Secondly, it pulls from the database when a key selection is ambiguous.

In a preferred embodiment, the system can also use unambiguous key selections to determine which finger was used (in the case where the finger tracking algorithm is unable to determine finger positions). So, the key-to-finger database can be used to disambiguate both a key selection and which finger was used, assuming one or the other is not ambiguous.

The various structures, methods and techniques disclosed herein may be implemented through execution of one or more sequences of instructions (i.e., software program(s)) within a computer system, or by a custom-built hardware ASIC (application-specific integrated circuit), or programmed on a programmable hardware device such as an FPGA (field-programmable gate array), or any combination thereof within or external to the computer system.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 12. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific dimensions, form factors, signal path widths, signaling or operating frequencies, component circuits or devices and the like can be different from those described above in alternative embodiments. Additionally, links or other interconnection between system components or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within a computing device having a touchscreen and one or more touch sensors, the method comprising:
    rendering a keyboard on the touchscreen, including rendering individual keys of the keyboard in respective positions on the touchscreen;
    sensing, via signals received from the one or more touch sensors, one or more fingers of a user hovering at respective hover locations above a surface of the touchscreen;
    while sensing the one or more fingers of the user hovering above the surface of the touchscreen, adjusting the respective positions of the individual keys on the touchscreen based on the respective hover locations of the one or more fingers of the user.

2. The method of claim 1, wherein the one or more touch sensors comprise one or more capacitive touch sensors.

3. The method of claim 1, further comprising:
    before rendering the keyboard:
        detecting contact with the touchscreen by a predetermined number of the user's fingers, wherein the respective positions of the individual keys for rendering on the keyboard are determined based on locations of the predetermined number of the user's fingers during the detected contact; and
        while detecting the contact with the touchscreen, generating, a handprint for the user, wherein adjusting the respective positions of the individual keys is also based at least in part on a comparison of the respective hover locations of the one or more fingers with the handprint.

4. The method of claim 1 wherein rendering individual keys of the keyboard in the respective positions on the touchscreen comprises displaying, for each of the individual keys, a graphical image of a respective individual key, the graphical image having a shape, area, locus and angular orientation, and wherein adjusting the respective positions of the individual keys comprises, changing at least one of the shape, area, locus or angular orientation of the respective individual key.

5. The method of claim 1 wherein rendering individual keys of the keyboard in respective positions on the touch screen comprises rendering, for each of the individual keys, a virtual depiction of a respective individual key, without a corresponding displayed graphical image, but having a shape, area, locus and angular orientation, and wherein adjusting the respective positions of the individual keys comprises, changing at least one of the shape, area, locus or angular orientation of the respective individual key.

6. The method of claim 1 wherein sensing the one or more fingers includes comprises sensing both hands of the user hovering at respective first and second locations above the surface of the touchscreen, wherein the first and second locations are offset from one another along an axis parallel to the surface of the touchscreen, and wherein adjusting the respective positions of the individual keys on the touchscreen surface comprises offsetting respective positions of a first set of the individual keys associated with one of the user's hands from respective positions of a second set of the individual keys associated with the other of the user's hands in accordance with the offset between the first and second locations of the user's hands.

7. The method of claim 1 further comprising generating a handprint of at least one hand of the user touching the touchscreen, and wherein sensing the respective fingers of the user hovering at the respective hover locations above the surface of the touchscreen comprises determining locations of the one or more fingers of the user's hand based at least in part on the handprint.

8. The method of claim 1 wherein rendering the keyboard on the touchscreen comprises at least one of (i) displaying the keyboard on the touchscreen or (ii) enabling a region of the touchscreen to function as a keyboard without displaying the keyboard, and wherein rendering individual keys of the keyboard in respective positions on the touchscreen comprises at least one of displaying the individual keys of the keyboard in respective positions on the touchscreen or (ii) enabling respective regions of the touchscreen to function as the individual keys of the keyboard without displaying the individual keys.

9. A computing device comprising:
a touchscreen;
one or more processors;
one or more touch sensors that are communicably coupled with the one or more processors and the touchscreen; and
a memory having program code stored therein which, when executed by one or more processors, causes the one or more processors to:
 render a keyboard on the touchscreen, including placing individual keys of the keyboard in respective positions on the touchscreen;
 sense, via signals received from the one or more touch sensors, one or more fingers of a user hovering at respective hover locations above a surface of the touchscreen;
 while sensing the one or more fingers of the user hovering above the surface of the touchscreen, adjust the respective positions of the individual keys on the touchscreen based on the respective hover locations of the one or more fingers of the user.

10. A method of operation within a computing device having a touchscreen, the method comprising:
 tracking respective locations of a user's fingers above the touchscreen;
 detecting that the user unambiguously types, using the user's first finger, a first key of a plurality of keys on a keyboard that is displayed on the touchscreen;
 generating, based on (i) the respective tracked locations of the user's fingers and (ii) the user's use of the first finger to unambiguously type the first key, finger-to-key correlation information that indicates, for one or more keys of the plurality of keys on the keyboard, which of the user's fingers is most likely to be used to type each of the one or more keys; and
 detecting an ambiguous input that is provided by the user's second finger, wherein the ambiguous input is detected near to two or more keys of the plurality of keys on the keyboard; and
 determining that the ambiguous input corresponds to selection of a particular key of the two or more keys based at least in part on (i) the generated finger-to-key correlation information and (ii) the user's use of the second finger to provide the ambiguous input.

11. The method of claim 10 wherein tracking respective locations of the user's fingers above the touchscreen comprises tracking locations of the user's fingers while the user's hands are hovering above a surface of the touchscreen.

12. The method of claim 10, wherein:
 the computing device further includes one or more capacitive touch sensors that are communicably coupled with the touchscreen, and
 tracking locations of the user's fingers while the user's hands are hovering above a surface of the touchscreen comprises sensing locations of the user's hands via signals received from the one or more capacitive touch sensors.

13. The method of claim 10, further comprising:
 generating a handprint of at least one hand of the user, wherein tracking respective locations of the user's fingers above the touchscreen comprises tracking locations of the user's fingers based at least in part on the handprint.

14. The method of claim 10 further comprising:
 detecting an unambiguous selection of a third character that is associated with a respective key;
 disambiguating which of the user's fingers was used to select the third character based at least in part on the finger-to-key correlation information.

15. The method of claim 10, further comprising:
 determining a typing style for the user, wherein the generated finger-to-key correlation information is further based on the determined typing style for the user.

16. The method of claim 10 further comprising, wherein:
 the ambiguous input is provided before the user types the first key, and
 determining that the ambiguous input corresponds to selection of the particular key is performed after the ambiguous input is provided.

17. A computing device comprising:
a touchscreen;
one or more processors; and
a memory having program code stored therein which, when executed by one or more processors, causes the one or more processors to:
 track respective locations of a user's fingers above the touchscreen;
 detect that the user unambiguously types, using the user's first finger, a first key of a plurality of keys on a keyboard that is displayed on the touchscreen;
 generate, based on (i) the respective tracked locations of the user's fingers and (ii) the user's use of the first finger to unambiguously type the first key, finger-to-key correlation information that indicates, for one or more keys of the plurality of keys on the keyboard, which of the user's fingers is most likely to be used to type each of the one or more keys; and
 detect an ambiguous input that is provided by the user's second finger, wherein the ambiguous input is detected near to two or more keys of the plurality of keys on the keyboard; and
 determine that the ambiguous input corresponds to selection of a particular key of the two or more keys based at least in part on (i) the generated finger-to-key correlation information and (ii) the user's use of the second finger to provide the ambiguous input.

18. The method of claim 10, wherein the computing device includes one or more touch sensors and the method further comprises:
 before tracking the respective locations of the user's fingers, sensing, via signals received from the one or more touch sensors, that one or more of the user's fingers are hovering above the touchscreen, wherein tracking the respective locations includes tracking the respective locations via signals received from the one or more touch sensors.

19. The method of claim 18, wherein the one or more touch sensors comprise one or more capacitive touch sensors.

* * * * *